United States Patent
Seo et al.

(10) Patent No.: US 9,445,413 B2
(45) Date of Patent: Sep. 13, 2016

(54) METHOD AND APPARATUS FOR RECEIVING CONTROL INFORMATION THROUGH BLIND DECODING OF AN ENHANCED PHYSICAL DOWNLINK CONTROL CHANNEL (EPDCCH)

(71) Applicant: LG ELECTRONICS INC., Seoul (KR)

(72) Inventors: Inkwon Seo, Anyang-si (KR); Hanbyul Seo, Anyang-si (KR); Hakseong Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 22 days.

(21) Appl. No.: 14/384,142

(22) PCT Filed: Mar. 22, 2013

(86) PCT No.: PCT/KR2013/002407
§ 371 (c)(1),
(2) Date: Sep. 9, 2014

(87) PCT Pub. No.: WO2013/141654
PCT Pub. Date: Sep. 26, 2013

(65) Prior Publication Data
US 2015/0063236 A1 Mar. 5, 2015

Related U.S. Application Data

(60) Provisional application No. 61/614,495, filed on Mar. 22, 2012, provisional application No. 61/617,032, filed on Mar. 28, 2012, provisional application No. 61/617,673, filed on Mar. 30, 2012, provisional application No. 61/621,001, filed on Apr. 6, 2012, provisional application No. 61/682,743, filed on Aug. 13, 2012.

(30) Foreign Application Priority Data

Mar. 22, 2013 (KR) .................. 10-2013-0030996

(51) Int. Cl.
*H04W 4/00* (2009.01)
*H04W 72/04* (2009.01)
(Continued)

(52) U.S. Cl.
CPC .............. *H04W 72/042* (2013.01); *H04L 5/00* (2013.01); *H04L 5/0053* (2013.01); *H04W 12/00* (2013.01); *H04W 48/12* (2013.01)

(58) Field of Classification Search
CPC . H04W 72/042; H04W 48/12; H04W 12/00; H04L 5/00; H04L 5/0053
See application file for complete search history.

(56) References Cited

U.S. PATENT DOCUMENTS

| 2011/0243090 A1 | 10/2011 | Grovlen et al. |
| 2011/0249633 A1* | 10/2011 | Hong .................... H04L 5/0053 370/329 |

(Continued)

FOREIGN PATENT DOCUMENTS

| WO | 2011/126212 | 10/2011 |
| WO | 2011/136523 | 11/2011 |

OTHER PUBLICATIONS

NTT Docomo, "On the Need of Common Search Space for E-PDCCH," 3GPP TSG RAN WG1 Meeting #68bis, R1-121476, Mar. 2012, 5 pages.

(Continued)

*Primary Examiner* — Abdelnabi Musa
(74) *Attorney, Agent, or Firm* — Lee, Hong, Degerman, Kang & Walmey; Jonathan Kang; Michael Monaco

(57) ABSTRACT

One embodiment of the present invention provides a method for enabling a terminal to receive control information in a wireless communication system, comprising the steps of: determining resource units for Enhanced Physical Downlink Control Channel (EPDCCH) of a plurality of resource units, with respect to each of one or more resource sets; and blind-decoding the resource units for the EPDCCH with respect to each of the one or more resource sets, wherein each of the one or more resource sets is set for one of localized EPDCCH transmission or distributed EPCCH transmission.

12 Claims, 15 Drawing Sheets

(51) Int. Cl.
*H04W 12/00* (2009.01)
*H04W 48/12* (2009.01)
*H04L 5/00* (2006.01)

(56) References Cited

U.S. PATENT DOCUMENTS

| | | | |
|---|---|---|---|
| 2013/0044693 A1* | 2/2013 | Lindh | H04L 5/0026 370/329 |
| 2013/0182664 A1* | 7/2013 | Chen | H04W 72/042 370/329 |
| 2013/0215842 A1* | 8/2013 | Han | H04W 72/042 370/329 |
| 2013/0235819 A1* | 9/2013 | Zhang | H04W 72/04 370/329 |
| 2013/0235821 A1* | 9/2013 | Chen | H04W 72/0406 370/329 |
| 2013/0250880 A1* | 9/2013 | Liao | H04W 72/042 370/329 |
| 2013/0343311 A1* | 12/2013 | Tee | H04L 5/001 370/329 |
| 2014/0092830 A1* | 4/2014 | Chen | H04W 72/042 370/329 |
| 2015/0305083 A1* | 10/2015 | Heo | H04L 5/0055 370/329 |

OTHER PUBLICATIONS

Renesas Mobile Europe Ltd., "Reference signals for ePDCCH," 3GPP TSG-RAN WG1 Meeting #68bis, R1-121396, Mar. 2012, 6 pages.

MediaTek Inc., "eCCE structure of ePDCCH," 3GPP TSG-RAN WG1 #68 bis, R1-121169, Mar. 2012, 6 pages.

Intel Corporation, "Search Space Design of ePDCCH," 3GPP TSG RAN WG1 Meeting #67, R1-113949, Nov. 2011, 5 pages.

InterDigital Communications, LLC, "On Search Space Design for ePDCCH in Rel-11," 3GPP TSG RAN WG1 Meeting #68, R1-120140, Feb. 2012, 4 pages.

Panasonic, "Considerations on search space design for enhanced PDCCH," 3GPP TSG RAN WG1 Meeting #67, R1-113816, Nov. 2011, 4 pages.

MediaTek Inc., "Physical Structure of ePDCCH and Its Mulitplexing with PDSCH," 3GPP TSG-RAN WG1 #68, R1-120629, Feb. 2012, 4 pages.

KDDI Corporation, "Configuration of localized and distributed transmission for E-PDCCH," 3GPP TSG RAN WG1 Meeting #68, R1-120681, Feb. 2012, 4 pages.

PCT International Application No. PCT/KR2013/002407, Written Opinion of the International Searching Authority dated Jul. 26, 2013, 1 page.

Panasonic, "Multiplexing of ePDCCHs and ePDCCH RE mapping," 3GPP TSG RAN WG1 Meeting #68bis, R1-121163, Mar. 2012, 6 pages.

Ericsson, et al., "Reference Signlas for ePDCCH," 3GPP TSG-RAN WG1 #68bis, R1-121021, Mar. 2012, 6 pages.

Ericsson, et al., "On reference signal design for enhanced control channels," 3GPP TSG-RAN WG1 #68, R1-120076, Feb. 2012, 4 pages.

MediaTek Inc., "Utilization of DRS Antenna Ports for Diversity and Beamforming Schemes in ePDCCH," 3GPP TSG-RAN WG1 #68bis, R1-121171, Mar. 2012, 6 pages.

European Patent Office Application Serial Number 13764508.1, Search Report dated Nov. 3, 2015, 9 pages.

* cited by examiner

FIG. 6
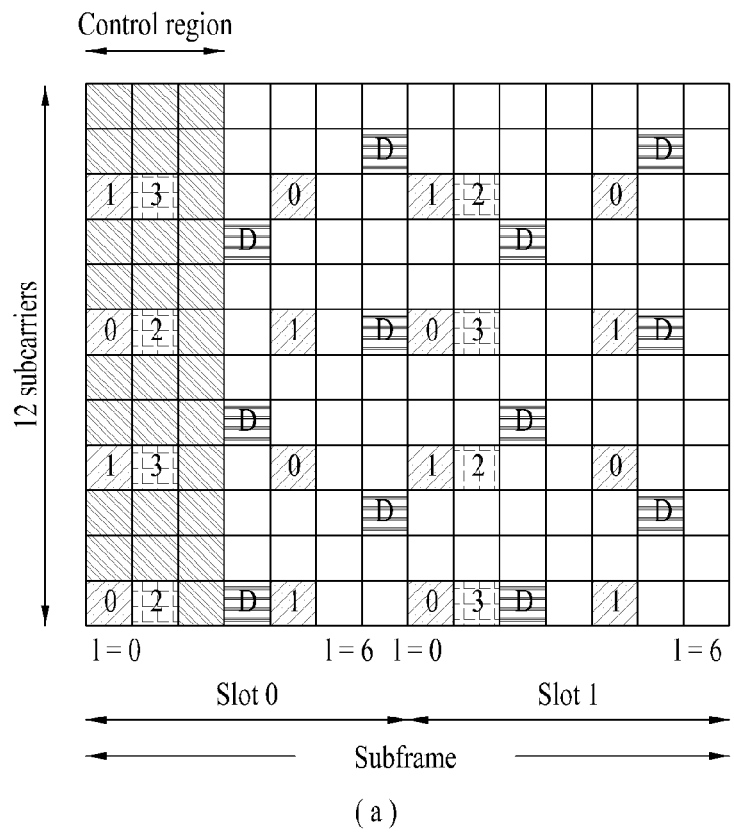
(a)
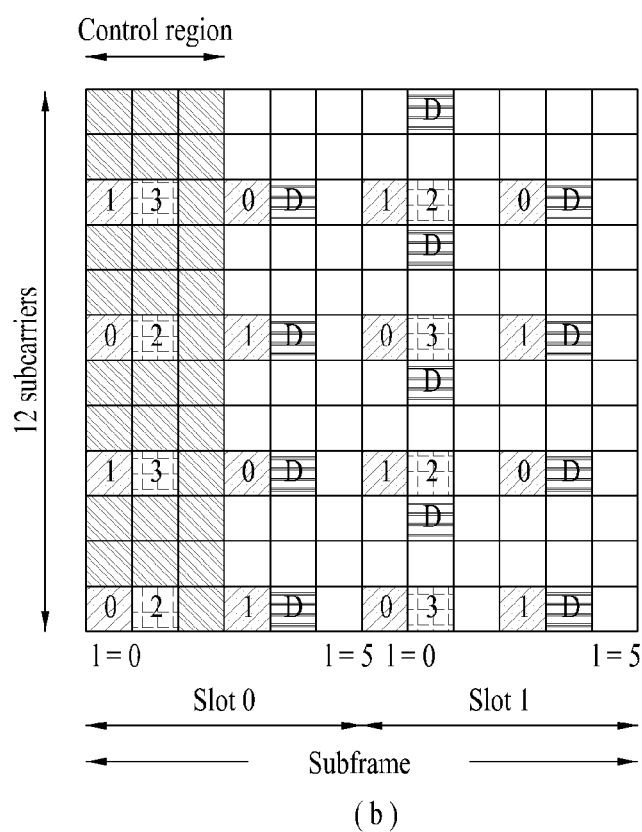
(b)

FIG. 13
▦ : ECCE for distributed transmission
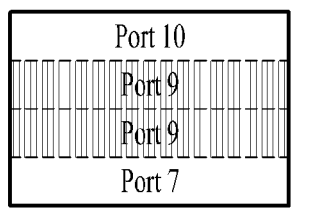
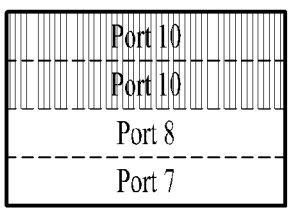
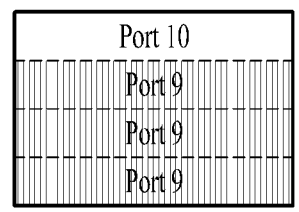
(a) Implicit allocation
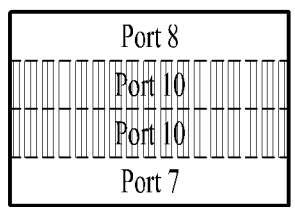
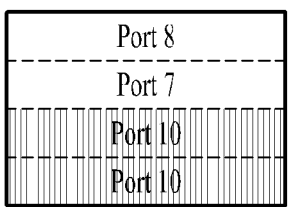
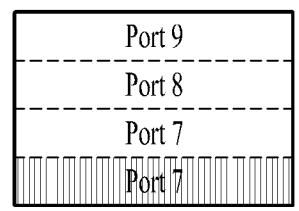
(b) Explicit allocation
FIG. 14
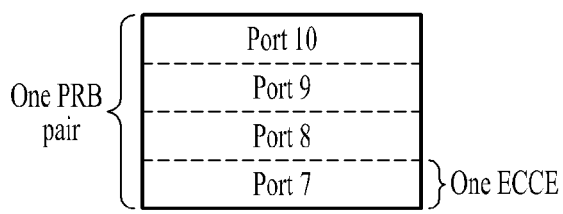
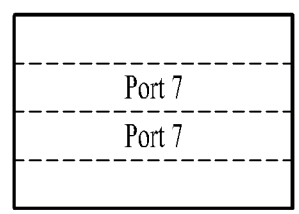
Resource-to-port mapping currently used in a transmission mode (e.g., beamforming mode) of the UE.
Resource-to-port mapping used in a transmission mode (e.g., distributed mode) not used by the UE.
↓ Port change
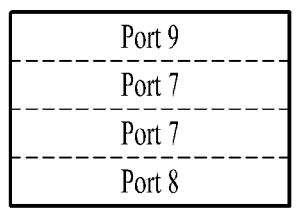
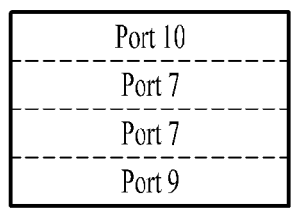
(a)            (b)

METHOD AND APPARATUS FOR RECEIVING CONTROL INFORMATION THROUGH BLIND DECODING OF AN ENHANCED PHYSICAL DOWNLINK CONTROL CHANNEL (EPDCCH)

CROSS-REFERENCE TO RELATED APPLICATIONS

This application is the National Stage filing under 35 U.S.C. 371 of International Application No. PCT/KR2013/002407, filed on Mar. 22, 2013, which claims the benefit of earlier filing date and right of priority to Korean Application No 10-2013-0030996, filed on Mar. 22, 2013 and also claims the benefit of U.S. Provisional Application Ser. No. 61/614, 495, filed on Mar. 22, 2012, 61/617,032, filed on Mar. 28, 2012, 61/617,673, filed on Mar. 30, 2012, 61/621,001, filed on Apr. 6, 2012 and 61/682,743, filed on Aug. 13, 2012, the contents of which are all hereby incorporated by reference herein in their entirety.

TECHNICAL FIELD

The present invention relates to a wireless communication system and, more particularly, to a method and apparatus for receiving control information through an enhanced physical downlink control channel (EPDCCH).

BACKGROUND ART

Wireless communication systems are widely deployed to provide various kinds of communication content such as voice and data. Generally, these communication systems are multiple access systems capable of supporting communication with multiple users by sharing available system resources (e.g., bandwidth and transmit power). Examples of multiple access systems include a code division multiple access (CDMA) system, a frequency division multiple access (FDMA) system, a time division multiple access (TDMA) system, an orthogonal frequency division multiple access (OFDMA) system, a single carrier frequency-division multiple access (SC-FDMA) system, and a multi-carrier frequency division multiple access (MC-FDMA) system.

DISCLOSURE

Technical Problem

An object of the present invention devised to solve the problem lies in a method for receiving control information through blind decoding of the EPDCCH.

It is to be understood that technical objects to be achieved by the present invention are not limited to the aforementioned technical object and other technical objects which are not mentioned herein will be apparent from the following description to one of ordinary skill in the art to which the present invention pertains.

Technical Solution

According to a first aspect of the present invention, provided herein is a method for receiving control information by a user equipment (UE) in a wireless communication system, including performing blind decoding on a plurality of resource units corresponding to each of at least one resource set, wherein the resource units are resource units for an enhanced physical downlink control Channel (EPDCCH) among resource units related to a downlink bandwidth; and each of the at least one resource set is configured for one of localized EPDCCH transmission and distributed EPCCH transmission.

According to a second aspect of the present invention, provided herein is a user equipment in a wireless communication system, including a receive module; and a processor, wherein the processor performs blind decoding on a plurality of resource units corresponding to each of at least one resource set, wherein the resource units are resource units for an enhanced physical downlink control channel (EPDCCH) among resource units related to a downlink bandwidth, and each of the at least one resource set is configured for one of localized EPDCCH transmission and distributed EPCCH transmission.

The first and second aspects of the present invention may include the following details.

Each of the resource units may be a physical resource block (PRB) pair, and the resource set is a PRB set.

information indicating that each of the at least one resource set is configured for either the localized EPDCCH transmission or the distributed EPCCH transmission may be signaled to the UE through higher layer signaling.

Determination of the resource units for the EPDCCH may be based on information about a resource set delivered through higher layer signaling.

The at least one resource set may include a first resource set configured for the localized EPDCCH transmission and a second resource set configured for the distributed EPDCCH transmission, and when an overlapping resource unit included in both the first and second resource sets is present among the resource units for the EPDCCH, the UE may consider only at least one antenna port other than at least one antenna port related to the distributed EPDCCH transmission as valid on the overlapping resource unit, among at least one antenna port related to the localized EPDCCH transmission.

The at least one resource set may include a first resource set configured for the localized EPDCCH transmission and a second resource set configured for the distributed EPDCCH transmission; and when an overlapping resource unit included in both the first and second resource sets is present among the resource units for the EPDCCH, the UE may use a pre-configured antenna port to perform blind decoding for a localized EPDCCH on the overlapping resource unit.

The pre-configured antenna port may be delivered through higher layer signaling.

The at least one antenna port related to the localized EPDCCH transmission may include antenna ports 107, 108, 109, and 110, and the at least one antenna port related to the distributed EPDCCH transmission may include antenna ports 107 and 109.

The PRB pair may include four enhanced control channel elements (ECCEs).

Each of the ECCEs may include four enhanced resource element groups (EREGs).

The localized EPDCCH transmission may be based on at least one consecutive ECCE according to aggregation level.

The distributed EPDCCH transmission may be based on an ECCE including EREGs belonging to PRB pairs.

Advantageous Effects

According to embodiments of the present invention, blind decoding may be efficiently performed according to the transmission type of the EPDCCH.

It will be appreciated by those skilled in the art that the effects that can be achieved with the present invention are not limited to what has been described above and other advantages of the present invention will be clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

FIG. 6 illustrates a reference signal.

FIGS. 12 to 14 illustrate port allocation in the case in which localized EPDCCH transmission and distributed EPDCCH transmission are mixed in one PRB pair according to one embodiment of the present invention.

BEST MODE

Figure 1:
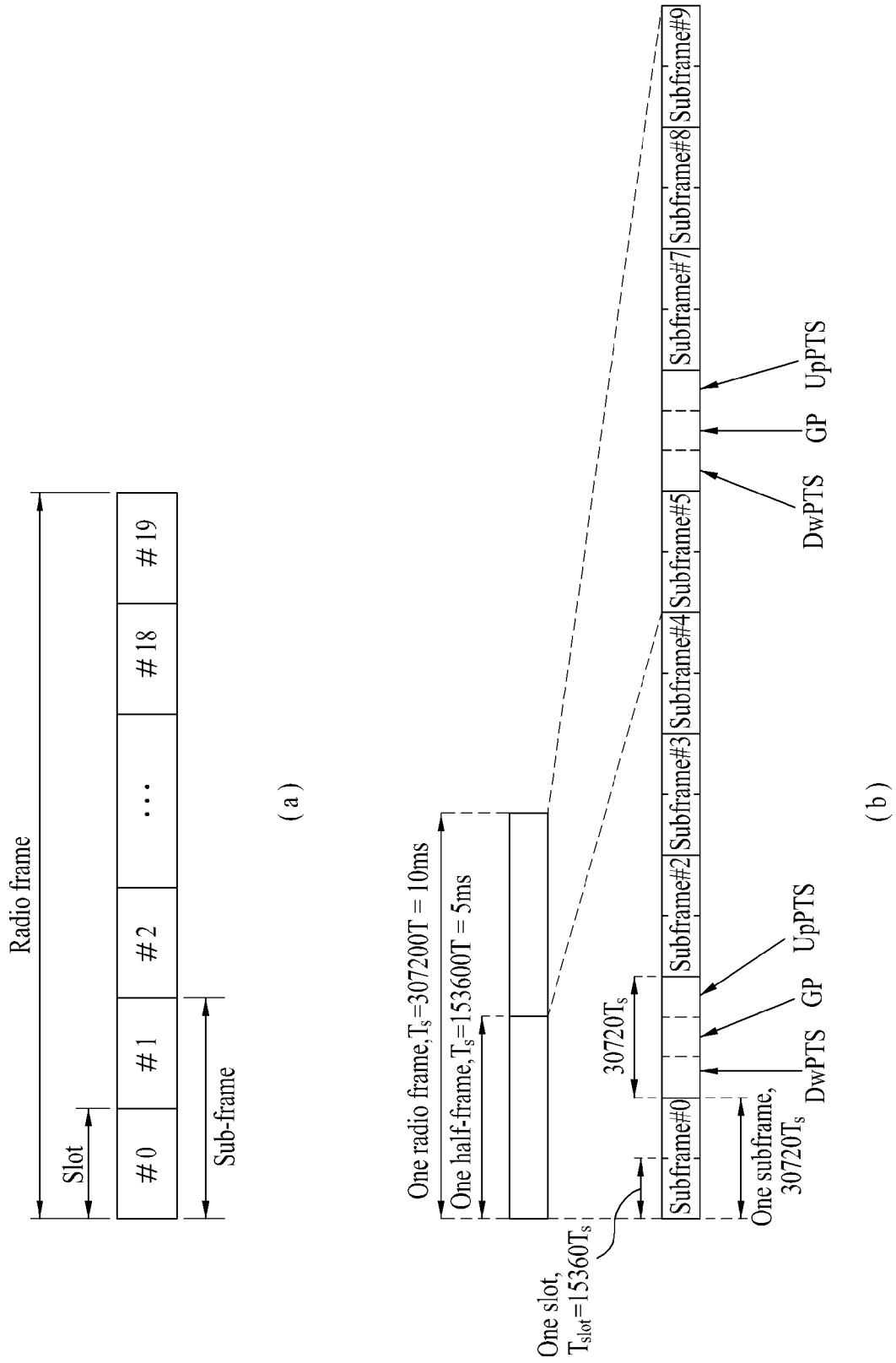
FIG. 1 illustrates a radio frame structure.

The embodiments described below are constructed by combining elements and features of the present invention in a predetermined form. The elements or features may be considered selective unless explicitly mentioned otherwise. Each of the elements or features can be implemented without being combined with other elements. In addition, some elements and/or features may be combined to configure an embodiment of the present invention. The sequence of the operations discussed in the embodiments of the present invention may be changed. Some elements or features of one embodiment may also be included in another embodiment, or may be replaced by corresponding elements or features of another embodiment.

Embodiments of the present invention will be described focusing on a data communication relationship between a base station and a terminal. The base station serves as a terminal node of a network over which the base station directly communicates with the terminal. Specific operations illustrated as being conducted by the base station in this specification may be conducted by an upper node of the base station, as necessary.

In other words, it will be obvious that various operations allowing for communication with the terminal in a network composed of several network nodes including the base station can be conducted by the base station or network nodes other than the base station. The term "base station (BS)" may be replaced with terms such as "fixed station," "Node-B," "eNode-B (eNB)," and "access point". The term "relay" may be replaced with such terms as "relay node (RN)" and "relay station (RS)". The term "terminal" may also be replaced with such terms as "user equipment (UE)," "mobile station (MS)," "mobile subscriber station (MSS)" and "subscriber station (SS)".

It should be noted that specific terms disclosed in the present invention are proposed for convenience of description and better understanding of the present invention, and these specific terms may be changed to other formats within the technical scope or spirit of the present invention.

In some cases, known structures and devices may be omitted or block diagrams illustrating only key functions of the structures and devices may be provided, so as not to obscure the concept of the present invention. The same reference numbers will be used throughout this specification to refer to the same or like parts.

Exemplary embodiments of the present invention are supported by standard documents for at least one of wireless access systems including an institute of electrical and electronics engineers (IEEE) 802 system, a 3rd generation partnership project (3GPP) system, a 3GPP long term evolution (LTE) system, an LTE-advanced (LTE-A) system, and a 3GPP2 system. In particular, steps or parts, which are not described in the embodiments of the present invention to prevent obscuring the technical spirit of the present invention, may be supported by the above documents. All terms used herein may be supported by the above-mentioned documents.

The embodiments of the present invention described below can be applied to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA may be embodied through wireless technologies such as universal terrestrial radio access (UTRA) or CDMA2000. TDMA may be embodied through wireless technologies such as global system for mobile communication (GSM)/general packet radio service (GPRS)/enhanced data rates for GSM evolution (EDGE). OFDMA may be embodied through wireless technologies such as IEEE 802.11 (Wi-Fi), IEEE 802.16 (WiMAX), IEEE 802-20, and evolved UTRA (E-UTRA). UTRA is a part of universal mobile telecommunications system (UMTS). 3rd generation partnership project (3GPP) long term evolution (LTE) is a part of evolved UMTS (E-UMTS), which uses E-UTRA. 3GPP LTE employs OFDMA for downlink and employs SC-FDMA for uplink. LTE-Advanced (LTE-A) is an evolved version of 3GPP LTE. WiMAX can be explained by IEEE 802.16e (wirelessMAN-OFDMA reference system) and IEEE 802.16m advanced (wirelessMAN-OFDMA advanced system). For clarity, the following description focuses on 3GPP LTE and 3GPP LTE-A systems. However, the spirit of the present invention is not limited thereto.

Hereinafter, a radio frame structure will be described with reference to FIG. 1.

In a cellular OFDM wireless packet communication system, an uplink (UL)/downlink (DL) data packet is transmitted on a subframe-by-subframe basis, and one subframe is defined as a predetermined time interval including a plurality of OFDM symbols. 3GPP LTE supports a type-1 radio frame structure applicable to frequency division duplex (FDD) and a type-2 radio frame structure applicable to time division duplex (TDD).

FIG. 1(a) illustrates the type-1 radio frame structure. A downlink radio frame is divided into ten subframes. Each subframe includes two slots in the time domain. The time taken to transmit one subframe is defined as a transmission time interval (TTI). For example, a subframe may have a duration of 1 ms and one slot may have a duration of 0.5 ms. A slot may include a plurality of OFDM symbols in the time domain and a plurality of resource blocks (RBs) in the frequency domain. Since 3GPP LTE employs OFDMA for downlink, an OFDM symbol represents one symbol period. An OFDM symbol may be referred to as an SC-FDMA symbol or a symbol period. A resource block (RB), which is a resource allocation unit, may include a plurality of consecutive subcarriers in a slot.

The number of OFDM symbols included in one slot depends on the configuration of a cyclic prefix (CP). CPs are divided into an extended CP and a normal CP. For a normal CP configuring each OFDM symbol, a slot may include 7 OFDM symbols. For an extended CP configuring each OFDM symbol, the duration of each OFDM symbol is extended and thus the number of OFDM symbols included in a slot is smaller than in the case of the normal CP. For the extended CP, a slot may include, for example, 6 OFDM symbols. When a channel status is unstable as in the case of high speed movement of a UE, the extended CP may be used to reduce inter-symbol interference.

When the normal CP is used, each slot includes 7 OFDM symbols, and thus each subframe includes 14 OFDM symbols. In this case, the first two or three OFDM symbols of each subframe may be allocated to a physical downlink control channel (PDCCH) and the other three OFDM symbols may be allocated to a physical downlink shared channel (PDSCH).

FIG. 1(b) illustrates the type-2 radio frame structure. The type-2 radio frame includes two half frames, each of which has 5 subframes, a downlink pilot time slot (DwPTS), a guard period (GP), and an uplink pilot time slot (UpPTS). Each subframe includes two slots. The DwPTS is used for initial cell search, synchronization, or channel estimation in a UE, whereas the UpPTS is used for channel estimation in an eNB and UL transmission synchronization in a UE. The GP is provided to eliminate interference taking place in UL due to multipath delay of a DL signal between DL and UL. Regardless of the type of a radio frame, a subframe of the radio frame includes two slots.

The illustrated radio frame structures are merely examples, and various modifications may be made to the number of subframes included in a radio frame, the number of slots included in a subframe, or the number of symbols included in a slot.

Figure 2:
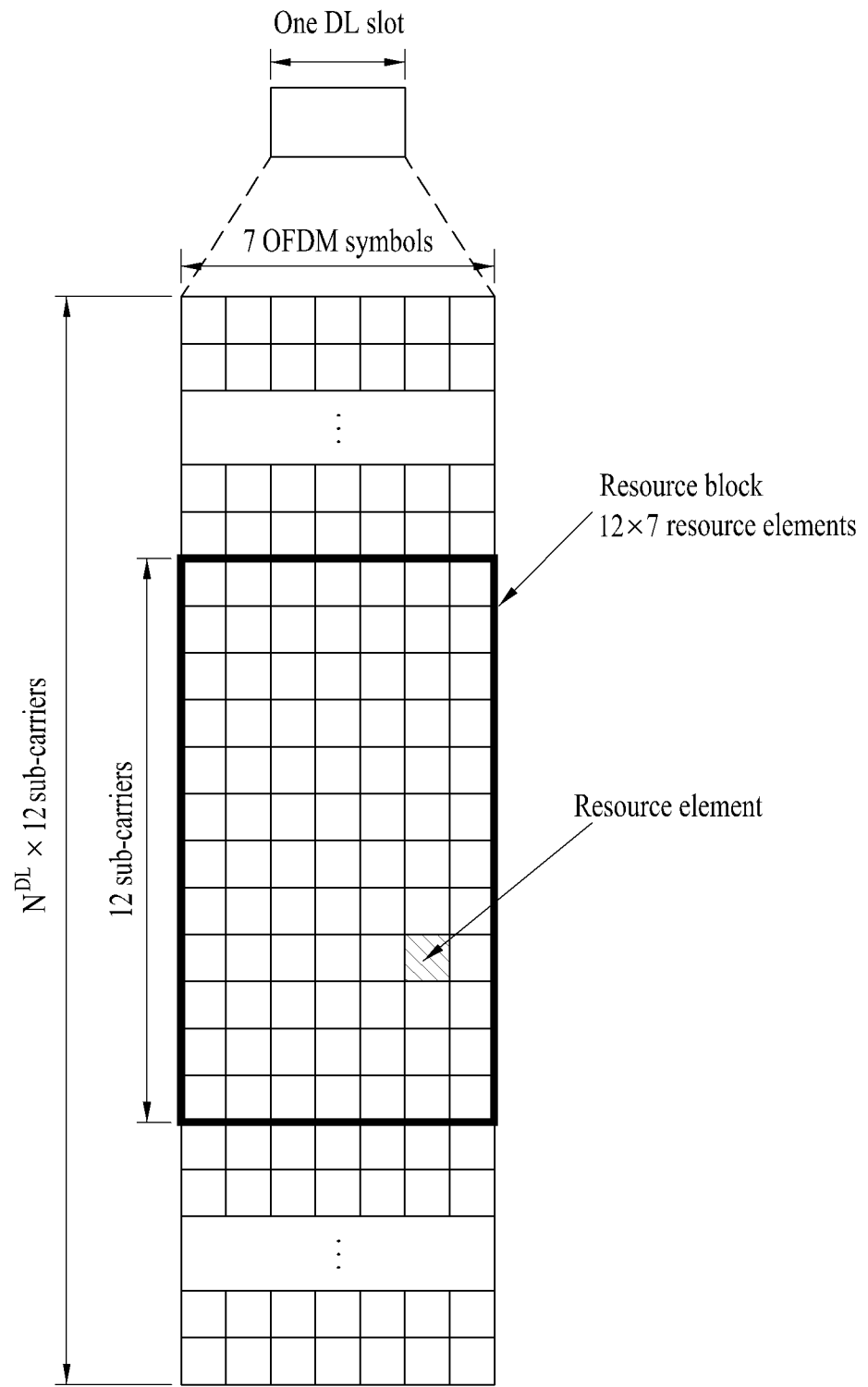
FIG. 2 is a diagram illustrating a resource grid for one downlink (DL) slot.

FIG. 2 is a diagram illustrating a resource grid for one DL slot. A DL slot includes 7 OFDM symbols in the time domain and an RB includes 12 subcarriers in the frequency domain. However, embodiments of the present invention are not limited thereto. For a normal CP, a slot may include 7 OFDM symbols. For an extended CP, a slot may include 6 OFDM symbols. Each element in the resource grid is referred to as a resource element (RE). An RB includes 12×7 REs. The number NDL of RBs included in a downlink slot depends on a DL transmission bandwidth. A UL slot may have the same structure as a DL slot.

Figure 3:
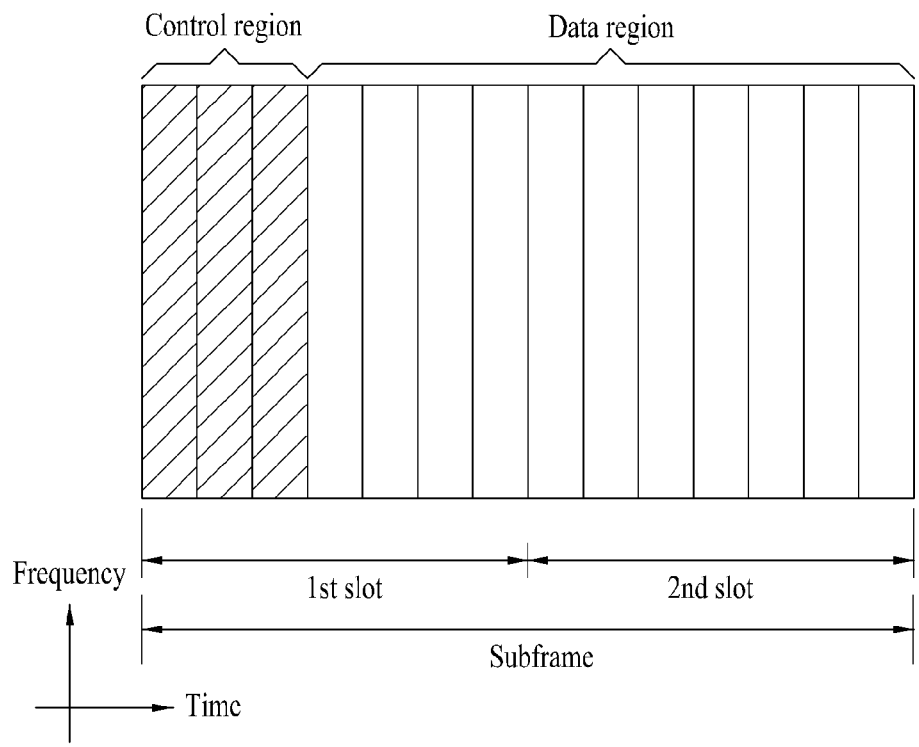
FIG. 3 is a diagram illustrating a DL subframe structure.

FIG. 3 illustrates a DL subframe structure. Up to the first three OFDM symbols of the first slot in a DL subframe are used as a control region to which control channels are allocated and the other OFDM symbols of the DL subframe are used as a data region to which a PDSCH is allocated. DL control channels used in 3GPP LTE include, for example, a physical control format indicator channel (PCFICH), a physical downlink control channel (PDCCH), and a physical hybrid automatic repeat request (HARQ) indicator channel (PHICH). The PCFICH is transmitted in the first OFDM symbol of a subframe, carrying information about the number of OFDM symbols used for transmission of control channels in the subframe. The PHICH carries a HARQ ACK/NACK signal in response to uplink transmission. Control information carried on the PDCCH is called downlink control information (DCI). The DCI includes UL or DL scheduling information or UL transmit power control commands for UE groups. The PDCCH delivers information about resource allocation and a transport format for a DL shared channel (DL-SCH), resource allocation information about a UL shared channel (UL-SCH), paging information of a paging channel (PCH), system information on the DL-SCH, information about resource allocation for a higher-layer control message such as a random access response transmitted on the PDSCH, a set of transmit power control commands for individual UEs of a UE group, transmit power control information, and voice over internet protocol (VoIP) activation information. A plurality of PDCCHs may be transmitted in the control region. A UE may monitor a plurality of PDCCHs. A PDCCH is formed by aggregating one or more consecutive control channel elements (CCEs). A CCE is a logical allocation unit used to provide a PDCCH at a coding rate based on the state of a radio channel. A CCE corresponds to a plurality of RE groups. The format of a PDCCH and the number of available bits for the PDCCH are determined depending on the correlation between the number of CCEs and a coding rate provided by the CCEs. An eNB determines the PDCCH format according to DCI transmitted to a UE and adds a cyclic redundancy check (CRC) to the control information. The CRC is masked by an identifier (ID) known as a radio network temporary identifier (RNTI) according to the owner or usage of the PDCCH. If the PDCCH is directed to a specific UE, its CRC may be masked by a cell-RNTI (C-RNTI) of the UE. If the PDCCH is for a paging message, the CRC of the PDCCH may be masked by a paging radio network temporary identifier (P-RNTI). If the PDCCH delivers system information, particularly, a system information block (SIB), the CRC thereof may be masked by a system information ID and a system information RNTI (SI-RNTI). To indicate that the PDCCH delivers a random access response in response to a random access preamble transmitted by a UE, the CRC thereof may be masked by a random access-RNTI (RA-RNTI).

Figure 4:
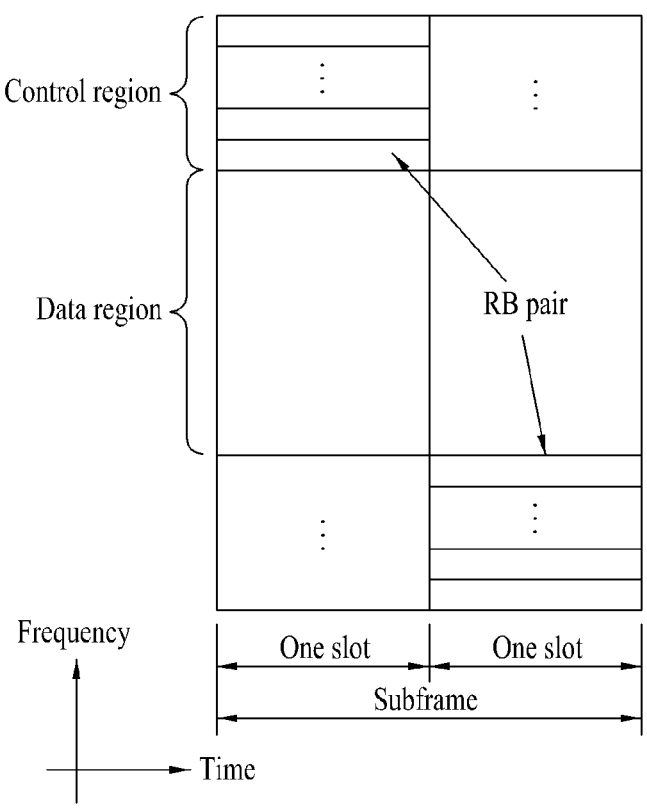
FIG. 4 is a diagram illustrating an uplink (UL) subframe structure.

FIG. 4 illustrates a UL subframe structure. A UL subframe may be divided into a control region and a data region in the frequency domain. A physical uplink control channel (PUCCH) carrying uplink control information is allocated to the control region and a physical uplink shared channel (PUSCH) carrying user data is allocated to the data region. To maintain single carrier property, a UE does not simultaneously transmit a PUSCH and a PUCCH. A PUCCH for a UE is allocated to an RB pair in a subframe. The RBs of the RB pair occupy different subcarriers in two slots. This is often called frequency hopping of the RB pair allocated to the PUCCH over a slot boundary.

DCI Format

DCI formats 0, 1, 1A, 1B, 1C, 1D, 2, 2A, 2B, 2C, 3, 3A and 4 are defined in LTE-A (Release 10). DCI formats 0, 1A, 3 and 3A are defined to have the same message size to reduce the number of times of blind decoding, which will be described later. The DCI formats may be divided into i) DCI formats 0 and 4 used for uplink grant, ii) DCI formats 1, 1A, 1B, 1C, 1D, 2, 2A, 2B and 2C used for downlink scheduling allocation, and iii) DCI formats 3 and 3A for power control commands according to purposes of use of control information to be transmitted.

DCI format 0 used for uplink grant may include a carrier indicator necessary for carrier aggregation, which will be described later, an offset (flag for format 0/format 1A differentiation) used to differentiate DCI formats 0 and 1A from each other, a frequency hopping flag that indicates whether frequency hopping is used for uplink PUSCH transmission, information about resource block assignment, used for a UE to transmit a PUSCH, a modulation and coding scheme, a new data indicator used to empty a buffer for initial transmission in relation to a HARQ process, a transmit power control (TPC) command for a scheduled PUSCH, information about a cyclic shift for a demodulation reference signal (DMRS) and OCC index, and a UL index and channel quality indicator request (CSI request) necessary for a TDD operation, etc. DCI format 0 does not include a redundancy version, unlike DCI formats relating to downlink scheduling allocation since DCI format 0 uses synchronous HARQ. The carrier indicator is not included in DCI formats when cross-carrier scheduling is not used.

DCI format 4, which is newly added to DCI formats in LTE-A Release 10, supports application of spatial multiplexing to uplink transmission in LTE-A. DCI format 4 has a larger message size DCI format 0 because it further includes information for spatial multiplexing. DCI format 4 includes additional control information in addition to control information included in DCI format 0. That is, DCI format 4 includes information on a modulation and coding scheme for the second transmission block, precoding information for multi-antenna transmission, and sounding reference signal (SRS) request information. DCI format 4 does not include an offset for differentiation between formats 0 and 1A because it has a larger size than DCI format 0.

DCI formats 1, 1A, 1B, 1C, 1D, 2, 2A, 2B and 2C for downlink scheduling allocation may be broadly divided into DCI formats 1, 1A, 1B, 1C and 1D, which do not support spatial multiplexing, and DCI formats 2, 2A, 2B and 2C, which support spatial multiplexing.

DCI format 1C supports only frequency contiguous allocation as compact frequency allocation and does not include the carrier indicator and redundancy version, compared to the other formats.

DCI format 1A is for downlink scheduling and random access. DCI format 1A may include a carrier indicator, an indicator that indicates whether downlink distributed transmission is used, PDSCH resource allocation information, a modulation and coding scheme, a redundancy version, a HARQ processor number for indicating a processor used for soft combining, a new data indicator used to empty a buffer for initial transmission in relation to a HARQ process, a TPC command for a PUCCH, an uplink index necessary for a TDD operation, etc.

DCI format 1 includes control information similar to that of DCI format 1A. DCI format 1 supports non-contiguous resource allocation, while DCI format 1A is related to contiguous resource allocation. Accordingly, DCI format 1 further includes a resource allocation header, and thus slightly increases control signaling overhead as a trade-off for an increase in flexibility of resource allocation.

Both DCI formats 1B and 1D further include precoding information, compared to DCI format 1. DCI format 1B includes PMI acknowledgement and DCI format 1D includes downlink power offset information. Most control information included in DCI formats 1B and 1D corresponds to that of DCI format 1A.

DCI formats 2, 2A, 2B and 2C basically include most control information included in DCI format 1A and further include information for spatial multiplexing. The information for spatial multiplexing includes a modulation and coding scheme for the second transmission block, a new data indicator, and a redundancy version.

DCI format 2 supports closed loop spatial multiplexing, and DCI format 2A supports open loop spatial multiplexing. Both DCI formats 2 and 2A include precoding information. DCI format 2B supports dual layer spatial multiplexing combined with beamforming and further includes cyclic shift information for a DMRS. DCI format 2C, which may be regarded as an extended version of DCI format 2B, supports spatial multiplexing for up to 8 layers.

DCI formats 3 and 3A may be used to complement the TPC information included in the aforementioned DCI formats for uplink grant and downlink scheduling allocation, namely, to support semi-persistent scheduling. A 1-bit command is used per UE in the case of DCI format 3, while a 2-bit command is used per UE in the case of DCI format 3A.

One of the DCI formats described above is transmitted through a PDCCH, and a plurality of PDCCHs may be transmitted in a control region. A UE may monitor the plurality of PDCCHs.

PDCCH Processing

Control channel elements (CCEs), contiguous logical allocation units, are used to map a PDCCH to REs for efficient processing. A CCE includes a plurality of resource element groups (e.g., 9 REGs). Each REG includes four neighboring REs other than an RS.

The number of CCEs necessary for a specific PDCCH depends on a DCI payload corresponding to a control information size, a cell bandwidth, a channel coding rate, etc. Specifically, the number of CCEs for a specific PDCCH may be defined according to PDCCH formats as shown in Table 1.

TABLE 1

| PDCCH format | Number of CCEs | Number of REGs | Number of PDCCH bits |
| --- | --- | --- | --- |
| 0 | 1 | 9 | 72 |
| 1 | 2 | 18 | 144 |
| 2 | 4 | 36 | 288 |
| 3 | 8 | 72 | 576 |

As described above, one of the four formats may be used for a PDCCH and is not known to the UE. Accordingly, the UE performs decoding without knowing the PDCCH format. This is called blind decoding. Since operation overhead is generated if a UE decodes all the CCEs usable for downlink for each PDCCH, a search space is defined in consideration of restriction on a scheduler and the number of decoding attempts.

That is, the search space is a set of candidate PDCCHs composed of CCEs on which a UE needs to attempt to perform decoding at an aggregation level. Each aggregation level and the corresponding number of candidate PDCCHs may be defined as shown in Table 2.

TABLE 2

| Search space | | Number of PDCCH |
|---|---|---|
| Aggregation level | Size (CCE unit) | candidates |
| UE-specific 1 | 6 | 6 |
| 2 | 12 | 6 |
| 4 | 8 | 2 |
| 8 | 16 | 2 |
| Common 4 | 16 | 4 |
| 8 | 16 | 2 |

As shown Table 2, the UE has a plurality of search spaces at each aggregation level because 4 aggregation levels are present. The search spaces may be divided into a UE-specific search space and a common search space, as shown in Table 2. The UE-specific search space is for specific UEs. Each UE may check an RNTI and CRC which mask a PDCCH by monitoring a UE-specific search space thereof (attempting to decode a PDCCH candidate set according to an available DCI format) and acquire control information when the RNTI and CRC are valid.

The common search space (CSS) is used for a case in which a plurality of UEs or all UEs need to receive PDCCHs, for system information dynamic scheduling or paging messages, for example. The CSS may be used for a specific UE for resource management. Furthermore, the CSS may overlap the UE-specific search space. The control information for the UEs may be masked by one of RA-RNTI, SI-RNTI and P-RNTI.

Specifically, the search space may be determined by Equation 1 given below.

$$L\{(Y_k+m')\mod \lfloor N_{CCE,k}/L \rfloor\}+i \qquad \text{Equation 1}$$

Here, L denotes an aggregation level, $Y_k$ is a variable determined by an RNTI and subframe number k, and m' is the number of PDCCH candidates. If carrier aggregation is applied, $m'=m+M^{(L)} \cdot n_{CI}$ and otherwise, m'=m. Herein, $M^{(L)}$ is the number of PDCCH candidates. $N_{CCE,k}$ is the total number of CCEs in the control region of a k-th subframe, and i is a factor indicating an individual CCE in each PDCCH candidate and is set as i=0, 1, . . . , L−1. For the CSS, $Y_k$ is always determined to be 0.

Figure 5:
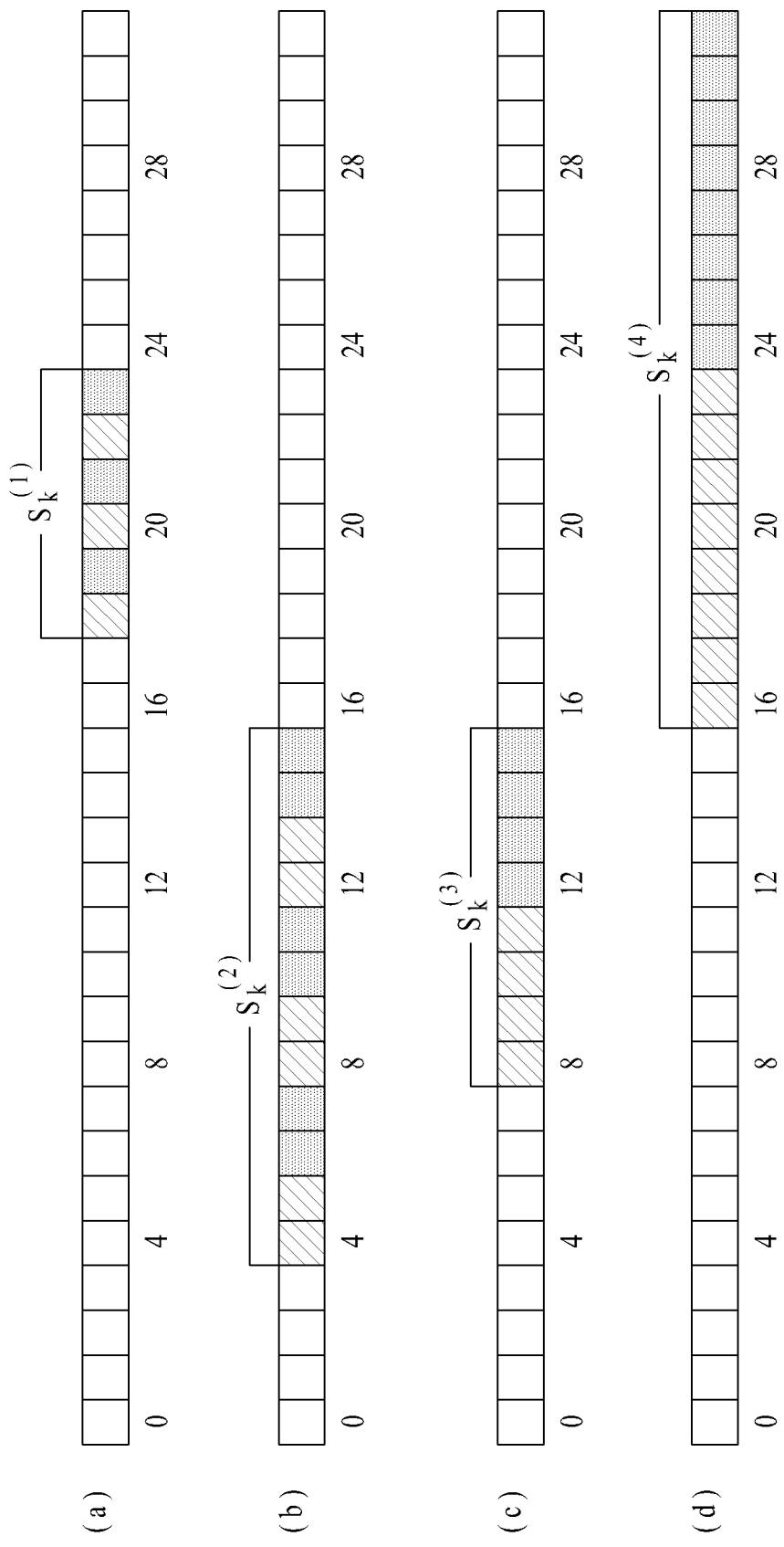
FIG. 5 illustrates a search space.

FIG. 5 shows USSs (shaded portions) at respective aggregation levels which may be defined according to Equation 1. Carrier aggregation is not used, and $N_{CCE,k}$ is set to 32 for simplicity of illustration.

FIGS. 5(a), 5(b), 5(c) and 5(d) illustrate the cases of aggregation levels 1, 2, 4 and 8, respectively. The numbers represent CCE numbers. In FIG. 5, the start CCE of a search space at each aggregation level is determined based on an RNTI and subframe number k. This CCE may be differently determined among the aggregations levels in the same subframe for a UE due to the modulo function and L. The CCE is always determined to correspond to a multiple of the aggregation level due to L. In the description given below, $Y_k$ is assumed to be CCE 18. The UE attempts to sequentially perform decoding from the start CCE in units of CCEs determined for a corresponding aggregation level. In FIG. 5(b), for example, The UE attempts to perform decoding from CCE 4, the start CCE, for every two CCEs according to the aggregation levels.

In this manner, the UE attempts to perform decoding for a search space. The number of decoding attempts is determined by a DCI format and a transmission mode determined through radio resource control (RRC) signaling. If carrier aggregation is not applied, the UE needs to attempt to perform decoding up to 12 times in a CSS, in consideration of two DCI sizes (DCI formats 0/1A/3/3A and DCI format 1C) for each of six PDCCH candidates. In a USS, the UE needs to attempt to perform decoding up to 32 times, in consideration of two DCI sizes for each of 16 PDCCH candidates (6+6+2+2=16). Accordingly, when carrier aggregation is not applied, the UE needs to attempt to perform decoding up to 44 times.

On the other hand, if carrier aggregation is applied, the maximum number of decodings increases because as many decodings for a USS and DCI format 4 as the number of DL resources (DL component carriers) are added.

Reference Signal (RS)

In transmitting packets in a wireless communication system, the packets are transmitted over a radio channel, and therefore signal distortion may occur in the transmission process. For a receiver to receive the correct signal in spite of signal distortion, the received distorted signal should be corrected using channel information. In detecting the channel information, a signal which is known to both the transmitter and the receiver is transmitted and the degree of distortion of the signal received over the channel is used to detect the channel information. This signal is referred to as a pilot signal or a reference signal.

In the case in which data is transmitted and received using multiple antennas, a channel state between a transmit antenna and a receive antenna needs to be identified to receive a correct signal. Accordingly, a separate RS is needed for each transmit antenna and, more particularly, for each antenna port.

RSs may be divided into a UL RS and a DL RS. In the current LTE system, the UL RSs include:

i) a demodulation-reference signal (DM-RS) for channel estimation for coherent demodulation of information transmitted over a PUSCH and a PUCCH, and ii) a sounding reference signal (SRS) for measuring UL channel quality at frequencies of different networks in the BS.

The DL RSs include:

i) a cell-specific reference signal (CRS) shared by all UEs in a cell;

ii) a UE-specific reference signal for a specific UE;

iii) a demodulation-reference signal (DM-RS) transmitted for coherent demodulation in the case of transmission of a PDSCH;

iv) a channel state information-reference signal (CSI-RS) for delivering channel state information (CSI) in the case of transmission of a DL DMRS;

v) a multimedia broadcast single frequency network (MBSFN) reference signal transmitted for coherent demodulation of a signal transmitted in an MBSFN mode, and vi) a positioning reference signal used to estimate geographic position information of a UE.

The RSs may be broadly divided into two reference signals according to the purposes thereof. There are an RS used to acquire channel information and an RS used for data demodulation. Since the former is used when the UE acquires channel information on DL, this RS should be transmitted over a wide band and even a UE which does not receive DL data in a specific subframe should receive the RS. This RS is also applied to situations such as handover. The latter RS is sent by the BS along with a resource on DL. The UE may receive the RS to perform channel measurement to implement data modulation. This RS should be transmitted in a region in which data is transmitted.

The CRS is used for acquisition of channel information and for data demodulation, and the UE-specific RS is used only for data demodulation. The CRS is transmitted in every subframe in a wide band and RSs for up to four antenna ports are transmitted according to the number of transmit antennas of the BS.

For example, if the number of transmit antennas of the BS is 2, CRSs for antenna ports #0 and #1 are transmitted. If the number of transmit antennas of the BS is 4, CRSs for antenna ports #0 to #3 are respectively transmitted.

FIG. 6 is a diagram illustrating a pattern in which CRSs and DRSs defined in a legacy 3GPP LTE system (e.g., Release-8) are mapped to resource block (RB) pairs. A downlink RB pair, as a unit to which an RS is mapped, may be represented as a unit of one subframe in the time domain times 12 subcarriers in the frequency domain. That is, one RB pair has a length of 14 OFDM symbols for a normal CP (FIG. 6(a)) and a length of 12 OFDM symbols for an extended CP (FIG. 6(b)).

FIG. 6 shows locations of RSs on RB pairs in a system in which the BS supports four transmit antennas. In FIG. 6, resource elements (REs) denoted by "0", "1", "2" and "3" represent the locations of the CRSs for antenna port indexes 0, 1, 2 and 3, respectively. In FIG. 6, REs denoted by "D" represent locations of the DMRSs.

In an LTE system after Release 11, an enhanced-PDCCH (EPDCCH) is considered as a solution to lack of capacity of a PDCCH due to coordinated multi-point (CoMP), multi user-multiple input multiple output (MU-MIMO), and the like and degradation of PDCCH performance due to inter-cell interference. In addition, channel estimation may be performed on an EPDCCH based on DMRSs contrary to the existing CRS-based PDCCH, in order to obtain a pre-coding gain.

While transmission of the PDCCH described above is performed based on REGs and CCEs configured with REGs, transmission of the EPDCCH may be performed based on enhanced REGs (EREGs), enhanced CCE (ECCEs), and physical resource block (PRB) pairs. Each ECCE may include four EREGs, and each PRB pair may include four ECCEs. EPDCCH also employs the concept of aggregation level as in the case of PDCCH, but the aggregation levels for the EPDCCH are based on ECCEs.

EPDCCH transmission may be divided into localized EPDCCH transmission and distributed EPDCCH transmission according to configuration of a PRB pair used for EPDCCH transmission. Localized EPDCCH transmission represents a case in which resource sets used for transmission of an EPDCCH neighbor each other in the frequency domain, and precoding may be applied to obtain a beam-forming gain. For example, localized EPDCCH transmission may be based on consecutive ECCEs the number of which corresponds to aggregation level. On the other hand, distributed EPDCCH transmission represents transmission of an EPDCCH in a separated PRB pair in the frequency domain, and has an advantage with regard to frequency diversity. For example, distributed EPDCCH transmission may be based on the ECCE having four EREGs included in each PRB pair separated in the frequency domain.

Hereinafter, various embodiments relating to blind decoding/search space configuration and antenna port mapping for EPDCCH transmission will be described.

Blind Decoding/Search Space Configuration for EPDCCH

As described above, EPDCCH transmission may be divided into localized EPDCCH transmission and distributed EPDCCH transmission. According to one embodiment of the present invention, a UE may configure a search space by distinguishing a resource set for localized EPDCCH transmission from a resource set for distributed EPDCCH transmission. Herein, the resource set may be as PRB set or an ECCE, and an eNB may indicate the transmission type (localized EPDCCH transmission or distributed EPDCCH transmission) of a resource set through higher layer signaling.

In other words, the UE may perform blind decoding at each aggregation level on a resource unit for EPDCCH among a plurality of resource units of a subframe (for example, if the resource set is a PRB set, the resource units may be PRB pairs or ECCEs (EREGs) and if the resource set is an ECCE, the ECCE or EREG may be a resource unit). Herein, the resource set may be configured for any one of localized EPDCCH transmission or distributed EPDCCH transmission.

Figure 7:
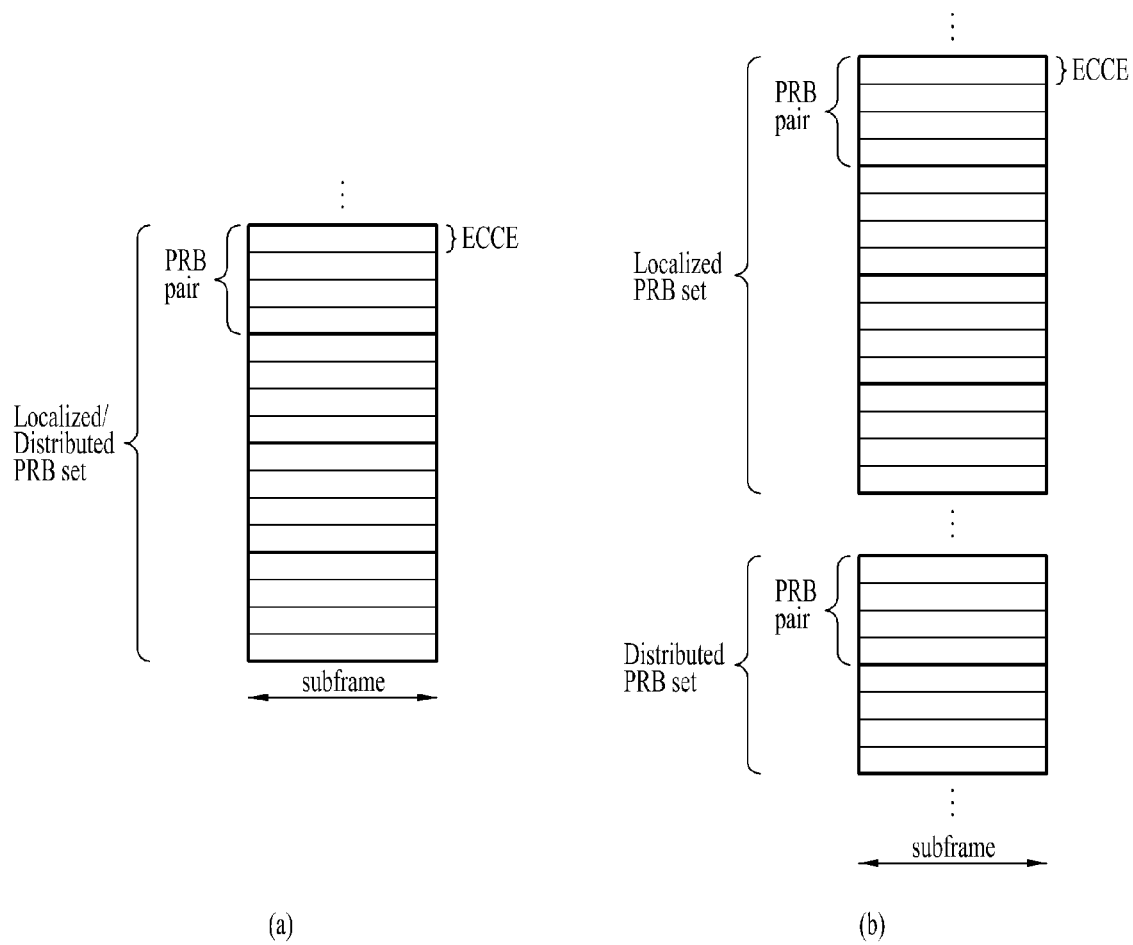
FIGS. 7 and 8 are diagrams illustrating blind decoding/search space configuration for EPDCCH according to one embodiment of the present invention.
Figure 8:
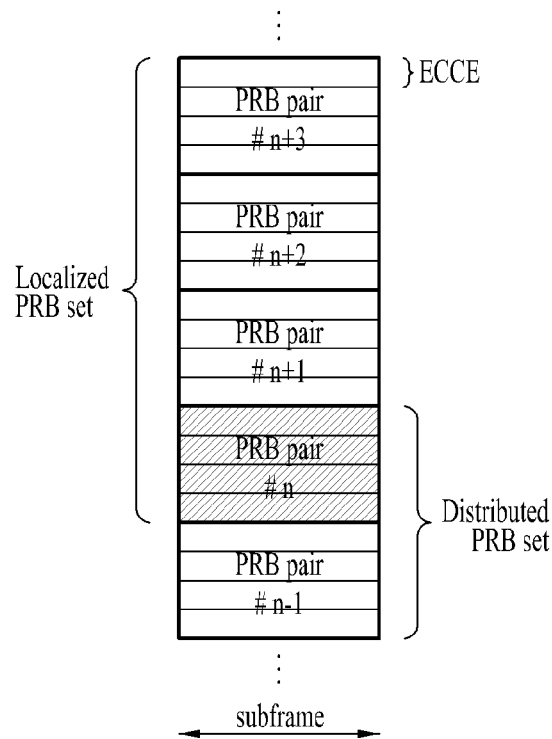

A more detailed description will be given of examples of FIGS. 7 and 8. In FIGS. 7 and 8, it is assumed that the resource set is a PRB set, and the resource unit is an ECCE or a PRB pair. While the PRB set is illustrated as having two or four PRB pairs in FIGS. 7 and 8, embodiments of the present invention are not limited thereto. Depending on configuration, the number of the PRB pairs of a PRB set may be set to 2, 4, 8, or the like. In FIGS. 7 and 8, PRB pairs included in a distributed PRB set are illustrated as being consecutive on the frequency axis for simplicity of illustration. Accordingly, the PRB pair included in a distributed PRB set may be considered non-consecutive on the frequency axis.

FIG. 7(a) illustrates a case in which one PRB set is configured for a UE, and FIG. 7(b) illustrates a case in which two PRB sets are configured for the UE. Referring to FIG. 7(a), the UE may recognize, through higher layer signaling, that one PRB set for EPDCCH is provided, and four PRB pairs are for EPDCCH transmission among the other PRB pairs of a subframe. The UE may also recognize whether this PRB set is for localized EPDCCH transmission or for distributed EPDCCH transmission. The UE may determine an EPDCCH candidate at each aggregation level according to the transmission type (localized EPDCCH transmission or distributed EPDCCH transmission) and perform decoding.

In FIG. 7(b), two PRB sets are configured for the UE. It may be indicated through higher layer signaling that one of the two PRB sets is a PRB set for localized EPDDCH (localized PRB set) and the other one is a PRB set for distributed EPDDCH (distributed PRB set). The UE may determine an EPDCCH candidate for each PRB set according to each transmission type and perform decoding. In the case in which two PRB sets are configured differently from the example of FIG. 7(b), both PRB sets may be for localized (or distributed) EPDCCH.

When two PRB sets (a PRB set for distributed EPDDCH and a PRB set for localized EPDDCH) are configured as described above, the PRBs included in the respective PRB sets may not be mutually exclusive. In other words, a PRB pair included in one PRB set may belong to another PRB pair. This case is illustrated in FIG. 8. Referring to FIG. 8, the PRB set for localized EPDDCH transmission includes PRB pair #n to PRB pair #n+3, and the PRB set for distributed EPDDCH transmission includes RB pair #n−1 to PRB pair #n. That is, PRB pair #n is included both in the PRB set for localized EPDDCH transmission and the PRB set for distributed EPDCCH transmission. If there is an overlapping PRB pair which is present in both PRB sets as in the above case, the UE may consider only at least one antenna port other than the antenna ports associated with distributed EPDCCH transmission as being valid on the overlapping PRB pair, among antenna ports associated with localized EPDCCH transmission. For example, if antenna ports 107 and 109 are associated with distributed EPDCCH, and antenna ports 107, 108, 109 and 110 are associated with localized EPDCCH, the UE may use only antenna ports 108 and 109 to perform blind decoding for the localized EPDCCH in the overlapping PRB pair. Alternatively, the UE may use only ports 108 and 109 to perform blind decoding for the localized EPDCCH. For example, ports may be predefined or indicated through higher layer signaling such that a port used for ECCE indexes 0, 1, 2, and 3 of the corresponding PRB pair is fixed to port 108 (or 109), and ECCE indexes 0 and 1 use port 108, and ECCE indexes 2 and 3 use port 109.

As another method for determining the transmission type of a resource set, a possible pattern may be predefined, and an eNB may signal the index of the pattern. In this case, it may be assumed that the pattern is defined for a certain number of resource units and repeated for all the resource units. For example, the pattern may be defined by a mapping table as shown in Table 3 below.

TABLE 3

| Resource type index | | | | | | | | |
|---|---|---|---|---|---|---|---|---|
| 0 | 1 | 2 | 3 | 4 | 5 | 6 | 7 | 8 |
| Transmission type L | L | L | L | D | D | L | L | L |

In Table 3, L denotes localized EPDCCH transmission, and D denotes distributed EPDCCH transmission. If resource unit indexes of a search space which are set through higher layer signaling are 2, 3, 4, 5, 6, and 7, the UE may exclude a resource unit of a specific type from the search space based on the signaled indexes. The specific type may be determined by higher layer signaling. That is, if a resource unit for distributed EPDCCH transmission needs to be excluded, resource unit indexes of a search space configured by the UE may be determined to be 2, 3, 6, and 7.

Figure 9:
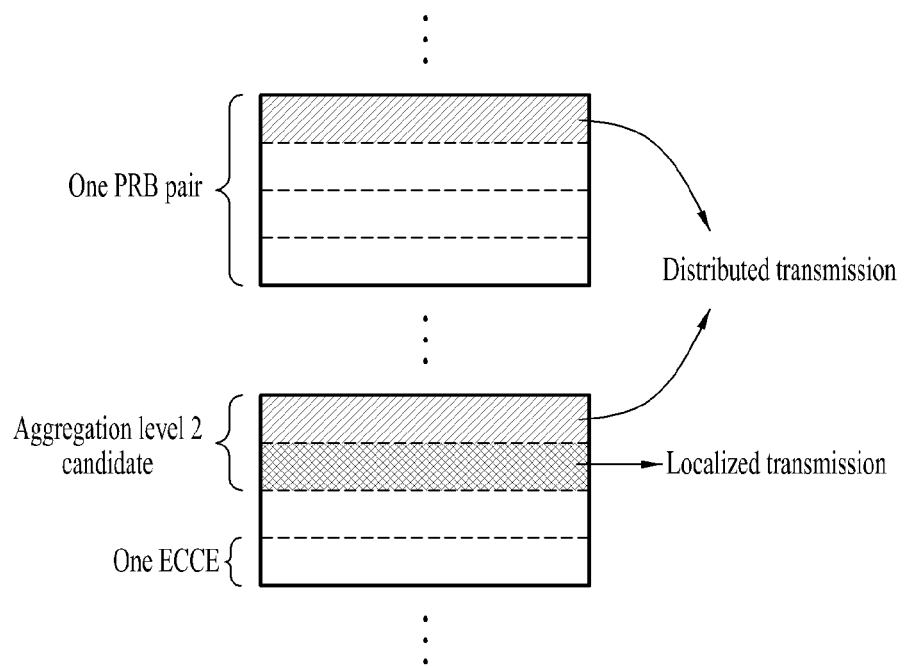
FIG. 9 is a diagram illustrating a method for performing antenna port mapping and decoding according to one embodiment of the present invention.

Hereinafter, a description will be given of methods to perform antenna port mapping and decoding when an ECCE for localized EPDCCH transmission and an ECCE for distributed EPDCCH transmission are present together in a one EPDCCH candidate as shown in FIG. 9. Referring to FIG. 9, ECCEs constituting an EPDCCH candidate of aggregation level 2 include an ECCE for localized EPDCCH transmission and an ECCE for distributed EPDCCH transmission. In this case, the UE may perform blind decoding/search space configuration using the following methods.

First, the UE may assume that ports for the ECCEs are different from each other although the ECCEs are in the same EPDCCH candidate. That is, decoding for the ECCE for distributed EPDCCH transmission may be performed using a PRB pair (or ECCE) for distributed EPDCCH transmission and a port defined for distributed EPDCCH transmission and then the result of decoding may be combined with a result of decoding for the ECCE for localized EPDCCH transmission (transmitted through port different from the port for distributed EPDCCH transmission) to perform blind decoding. In other words, in FIG. 9, an EPDCCH candidate of aggregation level 2 for a localized EPDCCH includes an ECCE for localized EPDCCH transmission and an ECCE for distributed EPDCCH transmission, and decoding is performed in the manner that decoding results for the respective ECCEs are combined together. That is, decoding for one ECCE is performed through a port for the ECCE for localized EPDCCH transmission, and decoding for the other ECCE is performed through another port for the ECCE for distributed EPDCCH transmission. This may mean that precoding can be performed differently for each ECCE.

Second, blind decoding for the EPDCCH candidate may be skipped. That is, if an ECCE for localized EPDCCH transmission and an ECCE for distributed EPDCCH transmission included in one EPDCCH candidate overlap each other, the UE may recognize such overlap and not perform blind decoding for the EPDCCH candidate.

Third, blind decoding of an EPDCCH candidate may be performed only for an ECCE of a specific transmission type among the ECCEs belonging to the EPDCCH candidate. Herein, the transmission type (localized or distributed) to be used may be determined based on the priority or the number of ECCEs. In the case in which the determination is based on the priority, an ECCE of a transmission type to be decoded may be predetermined or indicated through higher layer signaling. In the case in which the determination is based on the number of ECCEs, only the ECCEs of the specific transmission type may be used for EPDCCH candidate decoding if the aggregation level is greater than or equal to 4, or if the number of ECCEs of the specific transmission type is greater than the number of ECCEs of another transmission type. As another method to perform blind decoding using only ECCEs of the specific transmission type, ECCEs of different transmission types may not be included in the same search space in the process of search space configuration for the UE. That is, a search space only for localized (or distributed) EPDCCH transmission may be signaled to the UE. Alternatively, if an EPDCCH candidate of a higher aggregation level is determined based on a lower aggregation level, the EPDCCH candidate of aggregation level 1 may be configured only with ECCEs of a specific transmission type.

Figure 10:
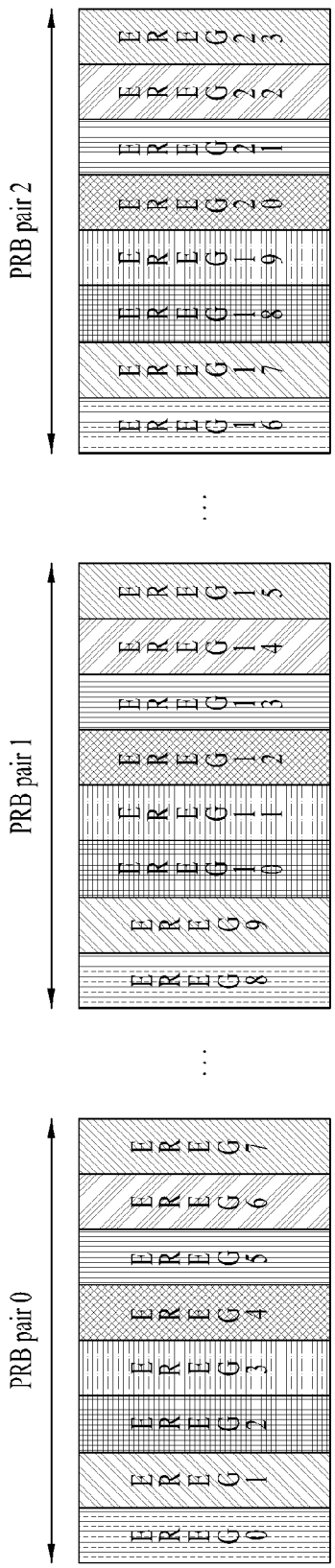
FIG. 10 is a diagram illustrating a method for configuring an EPDCCH candidate and a method for performing decoding according to one embodiment of the present invention.

Hereinafter, a description will be given, with reference to FIG. 10, of a method of EPDCCH candidate configuration and a decoding method for the case in which a resource set for localized EPDCCH transmission and a resource set for distributed EPDCCH transmission are present together in a PRB pair. In FIG. 10, it is assumed that one PRB pair has eight EREGs for simplicity of illustration. However, this example may also be applied to a case which one PRB pair has 16 EREGs.

In the case in which an EPDCCH candidate of an aggregation level for localized EPDCCH transmission includes an EREG for distributed EPDCCH transmission, the EPDCCH candidate may not be subjected to blind decoding. For example, if EREG 4 to EREG 7 constitute an EPDCCH candidate of aggregation level 2, and EREG 6 and EREG 7 are for distributed EPDCCH transmission in FIG. 10, the EPDCCH candidate including EREG 4 to EREG 7 is not subjected to blind decoding.

Alternatively, if an EPDCCH candidate of an aggregation level for localized EPDCCH transmission includes an EREG for distributed EPDCCH transmission, blind decoding for the EPDCCH candidate may be performed using only EREGs (or ECCEs) configured to be used for a localized EPDCCH. That is, blind decoding may be performed using only EREG 4 and EREG 5 in FIG. 10. This may be regarded as execution of rate matching for EREG 6 and EREG 7. To this end, the start positions of EPDCCH candidates of different aggregation levels may be set to be different from each other.

Alternatively, if an EPDCCH candidate of an aggregation level for localized EPDCCH transmission includes an EREG for distributed EPDCCH transmission, an offset may be applied to the start position of the EPDCCH candidate such that all the EREGs for a localized EPDCCH are contained in a PRB pair. That is, in FIG. 10, if PRB pair 0 is for localized EPDCCH transmission, PRB pair 1 is for localized and distributed EPDCCH transmissions, PRB pair 3 is for localized EPDCCH transmission and EREG 6 and EREG 7 are for distributed EPDCCH transmission, an EPDCCH candidate positioned at PRB pair 1 may be shifted to PRB pair 2.

Alternatively, if an EPDCCH candidate is for localized EPDCCH, but includes a resource set (an ECCE or an EREG set) for distributed EPDCCH, the EPDCCH candidate may be configured using the consecutive set indexes excluding the resource set. That is, in FIG. 10, if all the PRB pairs are localized EPDCCH candidates of aggregation level 4, and EREGs 4, 5, 6, and 7 are configured to be used for distributed EPDCCH, resource sets included in the EPDCCH candidate may be determined to be EREGs 0, 1, 2, 3, 8, 9, 10, and 11.

Antenna Port Configuration/Mapping for EPDCCH

Hereinafter, embodiments will be described in relation to mapping/configuration of antenna ports in an EPDCCH resource set (PRB set, ECCE set, EREG set, etc.).

Figure 11:
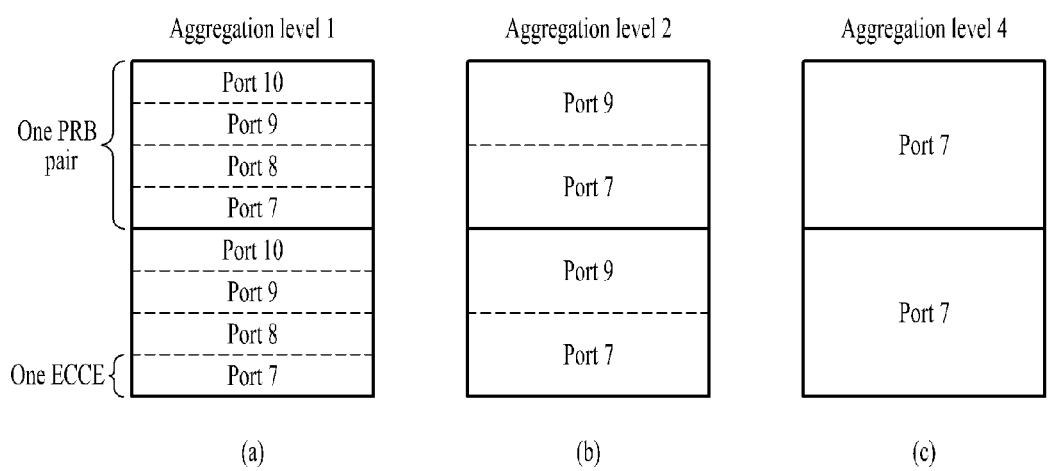
FIG. 11 illustrates an EPDCCH resource set and antenna port mapping according to one embodiment of the present invention.

FIG. 11 illustrates an EPDCCH resource set and antenna port mapping according to one embodiment of the present invention. Referring to FIGS. 11(a), 11(b), and 11(c), for aggregation levels 1, 2, and 4, the antenna port is allocated by unit of one ECCE, two ECCEs, and four ECCEs. That is, the antenna port is mapped according to the aggregation levels. In other words, an EPDCCH may use one antenna port to ensure scheduling flexibility and reduce decoding time. A mapping relationship between the ECCEs and the port may be UE-specifically delivered using a predetermined value (which means that a specific resource determines the port. That is, a resource at a specific position is transmitted through a specific port), or through higher layer signaling.

Figure 12:
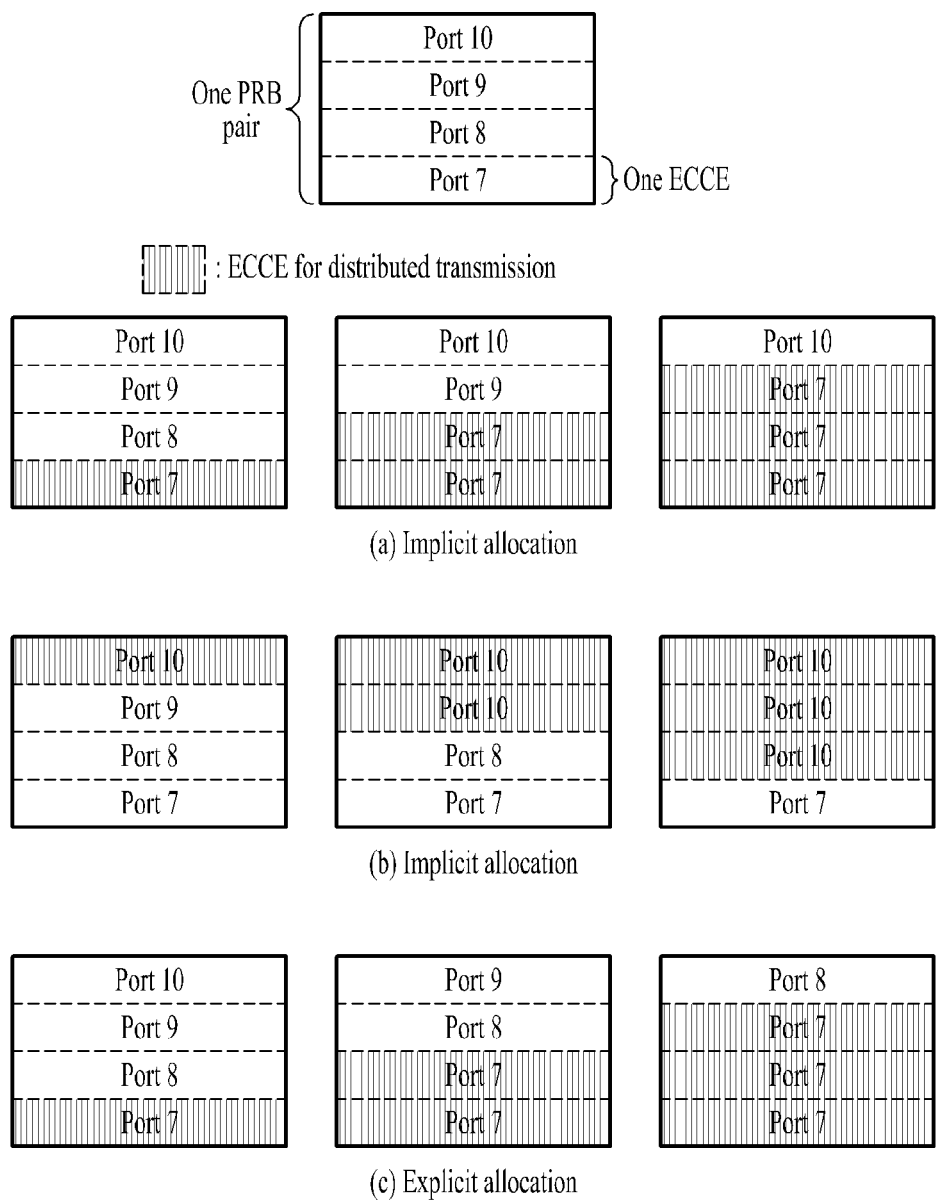

FIGS. 12 to 13 illustrate port allocation in the case in which localized EPDCCH transmission and distributed EPDCCH transmission are mixed in one PRB pair according to one embodiment of the present invention.

FIG. 12 illustrates a scheme in which ports other than the port for distributed EPDCCH transmission are sequentially allocated to ECCEs for localized EPDCCH transmission. Referring to FIG. 12, the ports for the ECCEs are implicitly or explicitly mapped in the order of indexes 7, 8, 9 and 10 in a PRB pair. FIG. 12(a) illustrates an example of implicit allocation, in which a port allocated to a specific ECCE in the PRB pair may be determined depending on the position of a resource constituting the ECCE. As the port is determined depending on the position of the ECCE in the implicit allocation, non-consecutive port allocation may be possible in each PRB pair. That is, as shown in FIG. 12(a), when two or three ECCEs for distributed EPDCCH transmission are present in a PRB pair, port allocation may be implemented as {7, 9, 10} or {7, 10}. FIG. 12(b) illustrates another example of implicit allocation on the assumption that port 10 is for distributed EPDCCH transmission. To summarize, in the examples of FIGS. 12(a) and 12(b), port allocation for ECCEs for localized EPDCCH transmission may change depending on the positions of ECCES for distributed EPDCCH transmission and ports.

FIG. 12(c) illustrates explicit allocation. Explicit allocation refers to a scheme in which a UE receives a port to be used for EPDCCH decoding through higher layer signaling. Referring to FIG. 12(c), the UE may recognize, through higher layer signaling, that ports 7, 8, 9, and 10 are mapped to the ECCEs in this order, and allocate the ports other than the port for an ECCE for distributed EPDCCH transmission to ECCEs for localized EPDCCH transmission in the order signaled.

FIG. 13 illustrates another example of implicit allocation and explicit allocation. Particularly, when implicit allocation is employed, a port used for distributed EPDCCH transmission represents use of a port corresponding to the position of a corresponding ECCE. If a plurality of ECCEs used for distributed EPDCCH transmission is present in a PRB pair, one of the ports allocated to the ECCE may be used as a port for distributed EPDCCH transmission.

When it is assumed that the UE implicitly or explicitly determines port mapping of a resource set (ECCE, EPDCCH candidate, and PRB pair) as described above, a mapping that the UE is employing (i.e., a transmission scheme corresponding to the current blind decoding by the UE) may conflict with mapping of the unused transmission type (i.e., the case in which the UE knows the transmission scheme for the resource, but this scheme is not the transmission scheme in which the UE is currently performing blind decoding). For example, referring to FIG. 14, if port 7, 8, 9, and 10 are implicitly/explicitly allocated to the CCEs in a PRB pair in this order in a transmission mode that the UE is currently using, and the port used for the distributed transmission type that the UE does not use is port 7, the UE cannot use port 7 for the distributed transmission type. To solve such conflict, the following methods may be used.

First, the ports may be sequentially allocated to the resources that the UE can use, except the antenna port for a transmission type that is not used by the UE. That is, as shown in FIG. 14(a), the UE cannot use two resource sets in the middle of the ECCEs in a PRB pair, and thus cannot use port 7. Accordingly, the other ports (ports 8, 9, and 10) may be sequentially allocated to the other resource sets. Herein, sequential allocation means mapping is performed according to the order of indexes of the ECCEs for EPDCCH in a PRB pair.

Second, to reduce interference from a different transmission type, the UE may allocate ports of a code division multiplexing (CDM) group to which a port used for the different transmission type does not belong first, among the ports usable by the UE. This means that ports of the CDM group having the port of the transmission type which is not employed by the UE have lower priority in relation to port reallocation. That is, in FIG. 14, sine the port used for distributed EPDCCH transmission is port 7, ports 9 and 10 belonging to a CDM group different from that of port 7 may be allocated first. Alternatively, ports of the other CDM group may be allocated, and then the remaining ports of the CDM group including the port used for the distributed type may be allocated. For example, if the port used for the distributed type is 8, and ECCE index is #1, antenna ports 7, 9, and 10 or antenna ports 9, 10, and 7 may be allocated to ECCE indexes #0, #2, and #3.

The UE may configure a search space based on the port mapping determined in the above two methods. At this time, the port/resource related to the transmission type that the UE does not employ may be excluded from the search space. In addition, DMRS configuration for the transmission type that is not used by the UE may employ a predefined mapping rule or be indicated for the UE through higher layer signaling.

Further, both resources and ports in the descriptions given above are restricted, but it is possible to apply restriction only to the ports. That is, in FIG. 14, the UE may reallocate ports to all the resource sets in the PRB pair. In this case, ports may be determined to be used except the port of a transmission type that the UE does not use.

Determination of the Number of Ports for a PRB Pair

Hereinafter, a method for setting the number of antenna ports used in each PRB pair for EPDCCH will be described. To maximize resource selectivity in the frequency domain and/or spatial domain, the number of ports for each PRB pair may be determined according to the number of PRB pairs on which EPDCCH transmission is performed and the EPDCCH candidates of aggregation level 1 (or the number of blind decodings). Further, to enhance the effect of spatial diversity, when two or more EPDCCH candidates of the same level (e.g., aggregation levels 1 and 2 in localized EPDCCH transmission) are present within a PRB pair, blind decoding may be performed using different ports for the EPDCCH candidates. In this case, the antenna port numbers used on the PRB pair (i.e., antenna ports used on the PRB pair) may be UE-specifically determined by a network according to a transmission scheme such as MU-MIMO and DPS.

For example, the number of ports for each PRB pair used for EPDCCH transmission by each UE (i.e., the number of EPDCCH candidates for each PRB pair) may be expressed as N+M in Equation 2 given below.

$$N = \begin{cases} \lfloor \frac{i}{j} \rfloor, & i \geq j \\ 1, & i < j \end{cases}$$

$$\sum_P M = \begin{cases} i \bmod j, & i \geq j \\ 0, & i < j \end{cases}$$

Equation 2

In Equation 2, N denotes the number of antenna ports that all the PRB pairs configured for EPDCCH transmission for a UE have in common, i denotes the number of EPDCCH candidates (or the number of blind decodings) for aggregation level 1, j denotes the number of PRB pairs configured through higher layer signaling, and P denote a PRB pair set configured for EPDCCH transmission. The value of M for each configured PRB pair may be determined to be 0 or 1, and the sum of values of M for all the configured PRB pairs equals the remainder obtained by dividing the number of EPDCCH candidates of aggregation level 1 by the number of configured PRB pairs. In Equation 2, if the denominator is greater than the numerator, it may be assumed that the UE uses only one antenna port for all the PRB pairs. In addition, the value of M for the respective PRB pairs may be determined according to a defined rule (e.g., the value is set to 1 from the lowest PRB pair index).

Figures 15, 16:
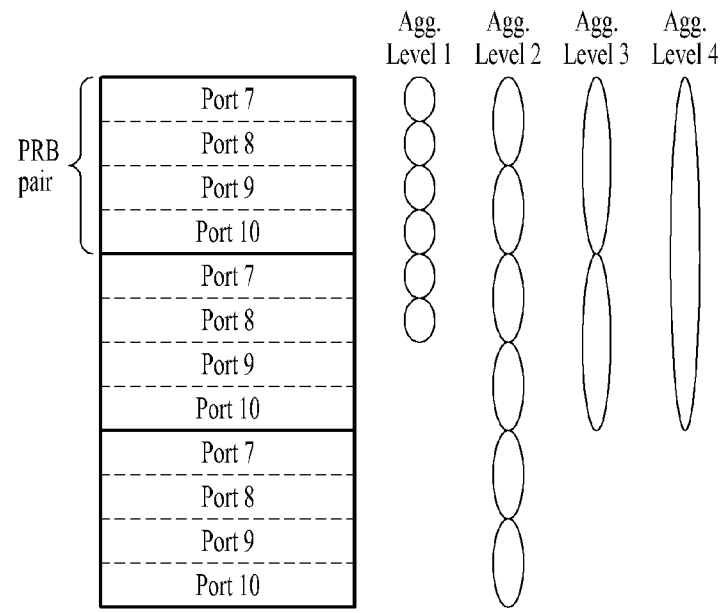
FIG. 15 is a diagram illustrating determination of the number of antenna ports for each PRB pair.
FIGS. 16 and 17 are diagrams illustrating allocation of a search space according to one embodiment of the present invention.

FIG. 15 illustrates an example of determining the number of antenna ports for each PRB pair according to Equation 2 described above. In FIG. 15, the example assumes that the values of M for the PRB pairs are sequentially allocated from the lowest PRB pair index, and that i, the number of EPDCCH candidates of aggregation level 1, is 6, and j, the number of PRB pairs for EPDCCH configured for the UE, is set to 6, 5, 4, 3, and 2.

Additionally, in determining the value of M for each PRB pair, M may be set using a scheme different from the scheme of setting M to 1 from the lowest PRB pair index, such as a scheme of distributing the values of M with the values equally spaced in a given PRB pair or a scheme of setting the value from a specific PRB pair. In the equally spacing distribution scheme, when the number of PRB pairs for EPDCCH is 4 in FIG. 15, the number of ports may be determined to be 2, 1, 2, and 1 for the respective PRB pairs (in this case, N is set to 1, 1, 1, and 1, and M is set to 1, 0, 1, and 0 for the respective PRB pairs).

Search Space Configuration in Consideration of Channel Estimation

A PDSCH is not transmitted on a PRB pair on which an EPDCCH is transmitted, and the number of the resources available on the PRB pair is greater than that of the resources necessary for EPDCCH transmission. Accordingly, multiple EPDCCHs are preferably transmitted on one PRB pair. In this case, the search space allocation by the UE may significantly affect the EPDCCH demodulation performance. For example, as shown in FIG. 16, when the position of each EPDCCH candidate is determined, EPDCCH decoding performance may significantly change depending on channel conditions. More specifically, in FIG. 16, EPDCCH candidates for each aggregation level are consecutively positioned on the frequency axis. In this case, if a specific frequency band in which EPDCCH candidates for a UE are concentrated is subjected to, for example, deep fading, the EPDCCH demodulation performance of the UE may be greatly degraded.

Another situation to be considered for allocation of an EPDCCH search space is a case in which two EPDCCHs are transmitted to the UE within a subframe. That is, an EPDCCH for DL grant and an EPDCCH for UL grant may be transmitted respectively. Preferably, such EPDCCHs are transmitted on the same PRB pair for beamforming gain.

Accordingly, in one embodiment of the present invention, a search space is configured according to the following rules, considering the above discussion.

First, PRB pairs constituting a search space for a UE are split and allocated in the frequency domain.

Second, the position of EPDCCH candidates corresponding to aggregation level 1 is restricted to two ECCEs per PRB pair. The ECCEs to be used as the position of the EPDCCH candidates for the UE may be indicated for the UE through RRC signaling. In addition, to lower signaling overhead, the search space is signaled PRB pair by PRB pair in indicating the search space through RRC signaling, and the position of the EPDCCH candidates on each PRB pair may be configured according to a predefined rule.

Figure 17:
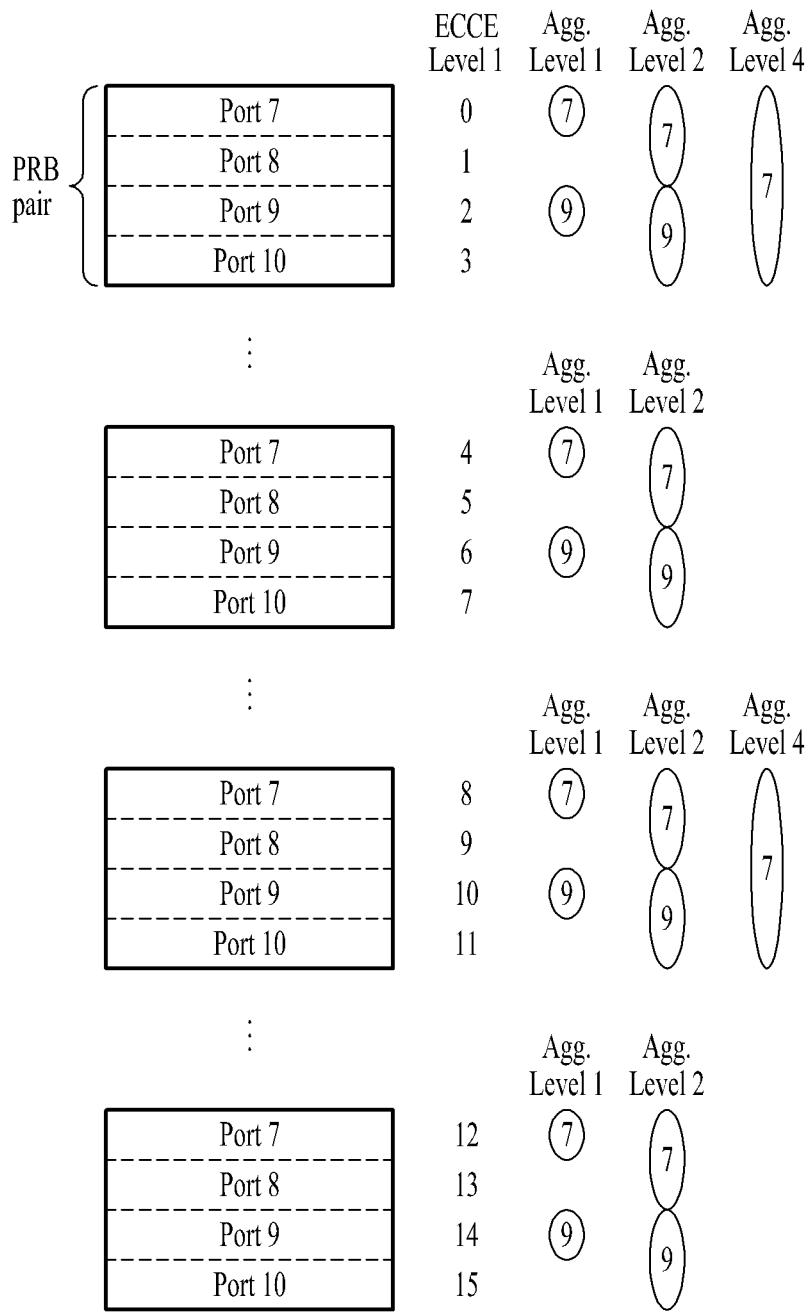

An example of search space configuration according to the rules described above is illustrated in FIG. 17. In FIG. 17, it is assumed that ECCE to port mapping for each PRB pair uses a combination of {7, 8, 9, 10} and that the number of blind decodings for aggregation levels 1, 2 and 4 are 8, 8, and 2, respectively. This assumption is for simplicity of illustration, and there may be various examples complying with the above rules regardless of aggregation levels and the number of blind decodings. In addition, in FIG. 17, the number for the position of EPDCCH candidates for each aggregation level corresponds to an antenna port for demodulation of the EPDCCH.

Referring to FIG. 17, EPDCCH channel estimation for each PRB pair is completed when it is performed once or twice at all aggregation levels. Accordingly, when the rules described above are followed, configuration of the search space may be implemented with the minimized number of channel estimations.

The example of FIG. 17 may also be embodied in the following manner. The port for each EPDCCH candidate may be configured through a combination of signaling of resource (e.g., ECCE)-to-port mapping and signaling of the search space definition. In signaling the resource-to-port mapping, a pattern of the same port mapping (for example, mapping, when four ECCEs are present in each PRB pair and indexed as 0, 1, 2, and 3 in each PRB pair, ECCE0 to port 7, ECCE1 to port 8, ECCE2 to port 9, and ECCE3 to port 10) may be signaled on all PRB pairs (e.g., PRB pairs on which EPDCCH is transmitted), or a different pattern of port mapping may be signaled for each PRB pair. Herein, the search space definition refers to a process of indicating, by an eNB, EPDCCH candidates for which the UE needs to perform blind decoding. The EPDCCH candidates for each aggregation level may be indicated for the UE by applying the aforementioned rule which prescribes that EPDCCH candidates of aggregation level 1 are restricted to two ECCEs per PRB pair configured for EPDCCH transmission. In this process, ports for the respective EPDCCH candidates may be defined in conjunction with the independently signaled port mapping. For an EPDCCH candidate of an aggregation level higher than or equal to 2, one of the ports for aggregation level 1 EPDCCH candidates (or ECCEs if aggregation level 1 EPDCCH candidates are not included) constituting the EPDCCH candidate may be selected.

Relationship Between EPDCCH and Demodulation RS Port

Figure 18:
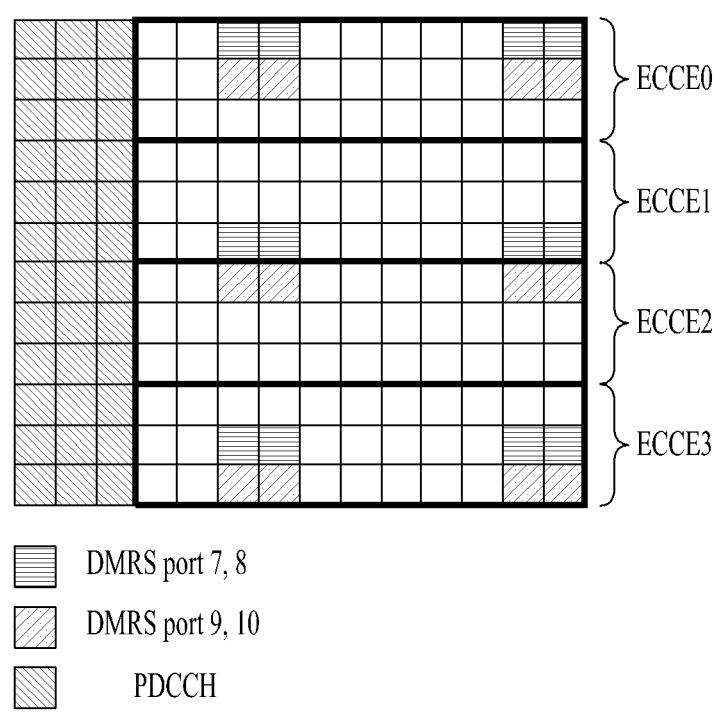
FIG. 18 is a diagram illustrating a relationship between an EPDCCH and a demodulation RS port according to one embodiment of the present invention.

Hereinafter, a description will be given of a method of determining a DMRS port that the UE uses in detecting an EPDCCH (i.e., ECCE to port mapping). Specifically, a description will be given of a method of mapping between a resource set (e.g., an ECCE) on which EPDCCH is transmitted and a DMRS port for EPDCCH demodulation and a method for signaling the mapping. In the following description, it is assumed that each PRB pair has four ECCEs as shown in FIG. 18.

The first method is to configure a port combination table and signal the indexes of the port combinations such that a port combination corresponding to an index is used for each of the PRB pairs. That is, all combinations of four RS ports may be listed to map an antenna port to each ECCE, and the network may indicate indexes of UE-specific or cell-specific RS port combinations through higher layer signaling. In this case, an MU-MIMO-based EPDCCH may be implemented, and inter-cell RS collision may be avoided. An example of the indexes of the combinations is shown in FIG. 4.

TABLE 4

| Index | {ECCE0, ECCE1, ECCE2, ECCE3} |
|---|---|
| 0 | {7, 8, 9, 10} |
| 1 | {7, 8, 10, 9} |
| 2 | {7, 9, 8, 10} |
| 3 | {7, 9, 10, 8} |
| ... | ... |
| 23 | {10, 9, 8, 7} |

The second method, which is based on the first method, is to signal an index for each PRB pair. 5 bits are needed to implement such signaling, but some of the combinations may be eliminated to lower signaling overhead. For example, in configuring a combination, antenna ports for consecutive ECCEs may belong to different CDM groups. That is, only combinations such as {7, 9, 8, 10} and {9, 7, 10, 8} may be considered. In the case in which these combinations are used, RS collision between ECCEs using the same time/frequency resources may be avoided when neighboring cells use the same time/frequency resources for EPDCCH transmission.

The combinations described above are configured such that ECCEs constituting a PRB pair use different ports, but the table may include a case in which consecutive ECCEs use the same port. That is, patterns such as {7, 7, 9, 9}, {8, 8, 10, 10}, {7, 7, 8, 8}, {9, 9, 10, 10}, {7, 7, 7, 7}, and {8, 8, 8, 8} may be added to Table 4. These patterns may be implemented in the form of {a, a, b, b}, {a, b, b, b}, {a, a, a, b}, {a, b, b, a}, and {a, a, a, a}. In the case in which identical ports are present in a PRB pair, the combinations may be useful when the ECCEs having the same port are used at different transmission points. To support such operations, virtual cell IDs may be grouped, and one of the patterns may be used in each group.

The third method is to link results of modulo operation for the virtual cell IDs to the aforementioned indexes. In other words, this method is to tie the indexes to another parameter signaled for an EPDCCH RS.

More specifically, a scrambling sequence for a DMRS may be derived from Equation 3 given below.

$$c_{init}=(\lfloor n_s/2 \rfloor+1) \cdot (2X+1) \cdot 2^{16}+n_{SCID} \qquad \text{Equation 3}$$

In Equation 3, X and $n_{SCID}$ may be contained and signaled in the DCI format. Equation 3 may be used even for an EPDCCH DMRS. However, in the case of EPDCCH, use of the DCI format is not allowed, and thus $n_{SCID}$ may be fixed to a specific value, and parameter X may be indicated through RRC signaling. Accordingly, modulo operation may be performed for parameter X signaled for the DMRS scrambling sequence to derive an index in an ECCE-to-port mapping table. Specifically, for example, if the ECCE-to-port mapping table is given as Table 4, the UE may determine the DMRS scrambling sequence index through modulo operation (X modulo 24).

Figure 19:
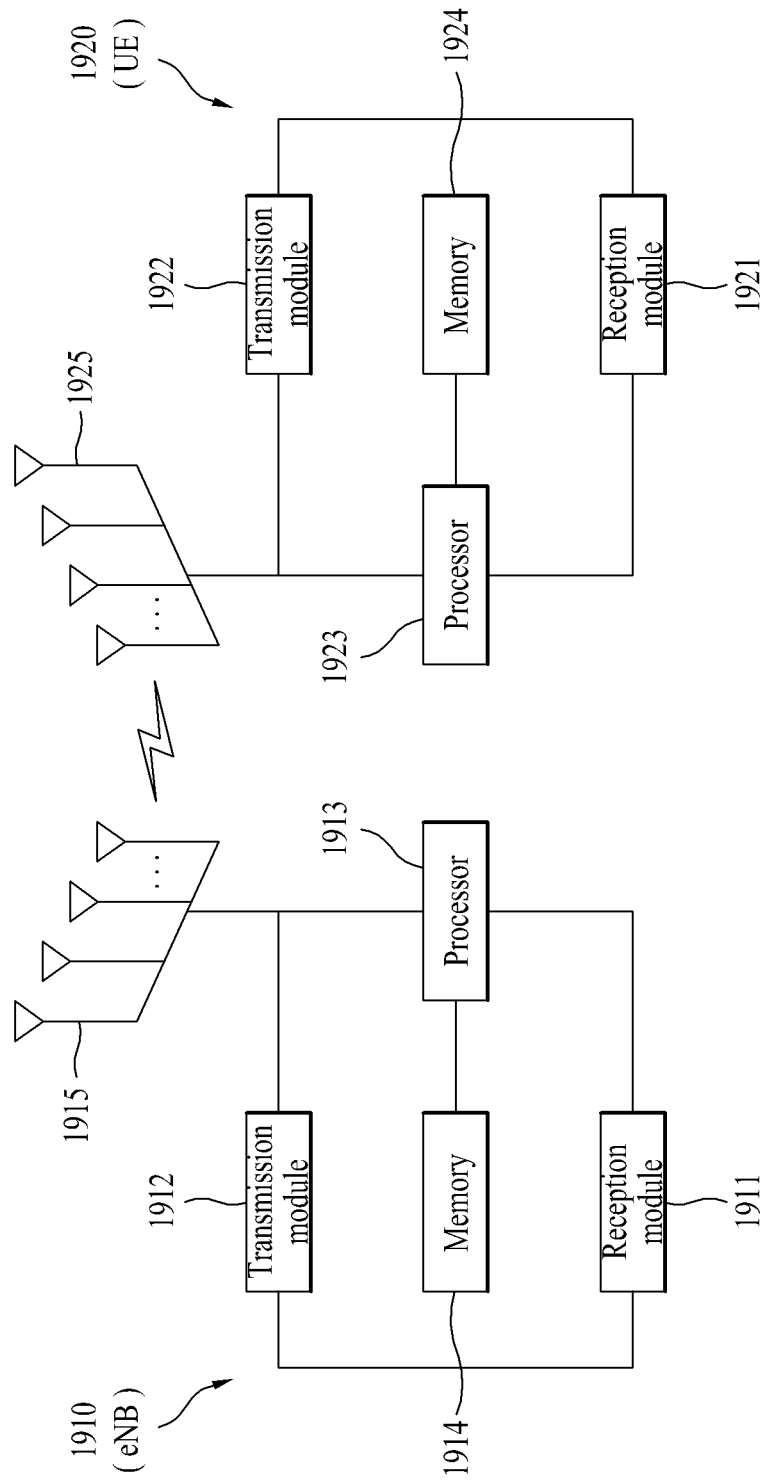
FIG. 19 is a diagram illustrating configuration of transceivers.

FIG. 19 is a diagram illustrating configurations of a transmission point apparatus and a UE according to one embodiment of the present invention.

Referring to FIG. 19, a transmission point apparatus 1910 may include a receive module 1911, a transmit module 1912, a processor 1913, a memory 1914, and a plurality of antennas 1915. The antennas 1915 represent a transmission point apparatus that supports MIMO transmission and reception. The receive module 1911 may receive various signals, data and information from a UE on uplink. The transmit module 1912 may transmit various signals, data and information to a UE on downlink. The processor 1913 may control overall operation of the transmission point apparatus 1910.

The processor 1913 of the transmission point apparatus 1910 according to one embodiment of the present invention may perform operations necessary for the embodiments described above.

Additionally, the processor 1913 of the transmission point apparatus 1910 may function to operationally process information received by the transmission point apparatus 1910 or information to be transmitted to the outside, etc. The memory 1914, which may be replaced with an element such as a buffer (not shown), may store the processed information for a predetermined time.

Referring to FIG. 19, a UE 1920 may include a receive module 1921, a transmit module 1922, a processor 1923, a memory 1924, and a plurality of antennas 1925. The antennas 1925 mean that the UE supports MIMO transmission and reception. The receive module 1921 may receive various signals, data and information from an eNB on downlink. The transmit module 1922 may transmit various signals, data and information to the eNB on uplink. The processor 1923 may control overall operation of the UE 1920.

The processor 1923 of the UE 1920 according to one embodiment of the present invention may perform operations necessary for the embodiments described above.

Additionally, the processor 1923 may function to operationally process information received by the UE 1920 or information to be transmitted to the outside, and the memory 1924, which may be replaced with an element such as a buffer (not shown), may store the processed information for a predetermined time.

The configurations of the transmission point apparatus and the UE as described above may be implemented such that the above-described embodiments are independently applied or two or more thereof are simultaneously applied, and description of redundant parts is omitted for clarity.

Description of the transmission point apparatus 1910 in FIG. 19 may also be applied to a relay which serves as a downlink transmitter or an uplink receiver, and description of the UE 1920 may be applied to a relay which serves as a downlink receiver or an uplink transmitter.

The embodiments of the present invention may be implemented through various means, for example, hardware, firmware, software, or a combination thereof.

When implemented by hardware, a method according to embodiments of the present invention may be embodied as one or more application specific integrated circuits (ASICs), one or more digital signal processors (DSPs), one or more digital signal processing devices (DSPDs), one or more programmable logic devices (PLDs), one or more field programmable gate arrays (FPGAs), a processor, a controller, a microcontroller, a microprocessor, etc.

When implemented by firmware or software, a method according to embodiments of the present invention may be embodied as a module, a procedure, or a function that performs the functions or operations described above. Software code may be stored in a memory unit and executed by a processor. The memory unit is located at the interior or exterior of the processor and may transmit and receive data to and from the processor via various known means.

Preferred embodiments of the present invention have been described in detail above to allow those skilled in the art to implement and practice the present invention. Although the preferred embodiments of the present invention have been described above, those skilled in the art will appreciate that various modifications and variations can be made in the present invention without departing from the spirit or scope of the invention. For example, those skilled in the art may use a combination of elements set forth in the above-described embodiments. Thus, the present invention is not intended to be limited to the embodiments described herein, but is intended to have the widest scope corresponding to the principles and novel features disclosed herein.

The present invention may be carried out in other specific ways than those set forth herein without departing from the spirit and essential characteristics of the present invention. Therefore, the above embodiments should be construed in all aspects as illustrative and not restrictive. The scope of the invention should be determined by the appended claims and their legal equivalents, and all changes coming within the meaning and equivalency range of the appended claims are intended to be embraced therein. The present invention is not intended to be limited to the embodiments described herein, but is intended to have the widest scope consistent with the principles and novel features disclosed herein. In addition, claims that are not explicitly cited in each other in the appended claims may be presented in combination as an embodiment of the present invention or included as a new claim by subsequent amendment after the application is filed.

INDUSTRIAL APPLICABILITY

The embodiments of the present invention as described above are applicable to various mobile communication systems.

The invention claimed is:

1. A method for receiving control information by a user equipment (UE) in a wireless communication system, the method comprising:
   receiving, via higher layer signaling, an enhanced physical downlink control channel (EPDCCH) configuration; and
   performing blind decoding on a plurality of physical resource block (PRB) pairs corresponding to each of at least one EPDCCH PRB set based on the EPDCCH configuration,
   wherein in performing the blind decoding, demodulation for an EPDCCH is performed by using a EPDCCH demodulation reference signal (DMRS),
   wherein the EPDCCH configuration indicates an EPDCCH DMRS scrambling sequence parameter for the EPDCCH DMRS other than a scrambling identity for the EPDCCH DMRS,
   wherein a scrambling sequence for the EPDCCH DMRS is initialized based on an equation '$(\lfloor n_s/2 \rfloor+1)\cdot(2X+1)\cdot 2^{16}+n_{SCID}$',
   where '$n_s$' denotes a slot number, 'X' denotes the EPDCCH DMRS scrambling sequence parameter indicated by the EPDCCH configuration and '$n_{SCID}$' denotes the scrambling identity,
   wherein the scrambling identity ($n_{SCID}$) for the EPDCCH DMRS is always fixed to a specific value, and
   wherein the scrambling identity $n_{SCID}$ for the EPDCCH DMRS does not depend on scrambling identity information contained in downlink control information (DCI).

2. The method according to claim 1, wherein the at least one EPDCCH PRB set based on EPDCCH configuration corresponds to localized EPDCCH transmission or distributed EPDCCH transmission.

3. The method according to claim 2, wherein:
   the at least one EPDCCH PRB set comprises a first EPDCCH PRB set configured for the localized EPDCCH transmission and a second EPDCCH PRB set configured for the distributed EPDCCH transmission; and
   when an overlapping PRB pair included in both the first EPDCCH PRB set and second EPDCCH PRB set is present among the PRB pairs for the EPDCCH, the UE considers only at least one antenna port other than at least one antenna port related to the distributed EPDCCH transmission as valid on the overlapping PRB pair, among at least one antenna port related to the localized EPDCCH transmission.

4. The method according to claim 3, wherein the at least one antenna port related to the localized EPDCCH transmission comprises antenna ports 107, 108, 109, and 110, and the at least one antenna port related to the distributed EPDCCH transmission comprises antenna ports 107 and 109.

5. The method according to claim 2, wherein:
   the at least one EPDCCH PRB comprises a first EPDCCH PRB configured for the localized EPDCCH transmission and a second EPDCCH PRB configured for the distributed EPDCCH transmission; and when an overlapping PRB pair included in both the first EPDCCH PRB set and second EPDCCH PRB set is present among the PRB pairs for the EPDCCH, the UE uses a pre-configured antenna port to perform blind decoding for a localized EPDCCH on the overlapping PRB pair.

6. The method according to claim 5, wherein the pre-configured antenna port is delivered through higher layer signaling.

7. The method according to claim 2, wherein each of the PRB pairs comprises four enhanced control channel elements (ECCEs).

8. The method according to claim 7, wherein each of the ECCEs comprises four enhanced resource element groups (EREGs).

9. The method according to claim 8, wherein the localized EPDCCH transmission is based on at least one consecutive ECCE according to aggregation level.

10. The method according to claim 8, wherein the distributed EPDCCH transmission is based on an ECCE comprising EREGs belonging to the PRB pairs.

11. The method according to claim 1, wherein determination of the PRB pairs for the EPDCCH is based on information about a resource set delivered through higher layer signaling.

12. A user equipment in a wireless communication system, comprising:

a receiver configured to receive, via higher layer signaling, an enhanced physical downlink control channel (EPDCCH) configuration; and a processor configured to perform blind decoding on a plurality of physical resource block (PRB) pairs corresponding to each of at least one EPDCCH PRB set based on the EPDCCH configuration, wherein in performing the blind decoding, demodulation for an EPDCCH is performed by using a EPDCCH demodulation reference signal (DMRS), wherein the EPDCCH configuration indicates an EPDCCH DMRS scrambling sequence parameter for the EPDCCH DMRS other than a scrambling identity for the EPDCCH DMRS, wherein a scrambling sequence for the EPDCCH DMRS is initialized based on an equation '$(\lfloor n_s/2 \rfloor + 1) \cdot (2X+1) \cdot 2^{16} + n_{SCID}$', where '$n_s$' denotes a slot number, 'X' denotes the EPDCCH DMRS scrambling sequence parameter indicated by the EPDCCH configuration and '$n_{SCID}$' denotes the scrambling identity, wherein the scrambling identity ($n_{SCID}$) for the EPDCCH DMRS is always fixed to a specific value, and wherein the scrambling identity $n_{SCID}$ for the EPDCCH DMRS does not depend on scrambling identity information contained in downlink control information (DCI).

* * * * *